US011181170B2

(12) United States Patent
Fujimoto et al.

(10) Patent No.: US 11,181,170 B2
(45) Date of Patent: Nov. 23, 2021

(54) PLANETARY GEAR DEVICE AND PLANETARY GEAR DEVICE DESIGN PROGRAM

(71) Applicant: National University Corporation Yokohama National University, Yokohama (JP)

(72) Inventors: Yasutaka Fujimoto, Yokohama (JP); Daiji Kobuse, Yokohama (JP)

(73) Assignee: National University Corporation Yokohama National University, Yokohama (JP)

( * ) Notice: Subject to any disclaimer, the term of this patent is extended or adjusted under 35 U.S.C. 154(b) by 173 days.

(21) Appl. No.: 16/307,116

(22) PCT Filed: Jun. 6, 2017

(86) PCT No.: PCT/JP2017/021022
§ 371 (c)(1),
(2) Date: Dec. 4, 2018

(87) PCT Pub. No.: WO2017/213151
PCT Pub. Date: Dec. 14, 2017

(65) Prior Publication Data
US 2020/0309235 A1 Oct. 1, 2020

(30) Foreign Application Priority Data
Jun. 6, 2016 (JP) .............................. JP2016-112434

(51) Int. Cl.
*F16H 57/00* (2012.01)
*F16H 1/46* (2006.01)
(Continued)

(52) U.S. Cl.
CPC ............. *F16H 1/46* (2013.01); *F16H 57/082* (2013.01); *F05B 2260/40311* (2013.01);
(Continued)

(58) Field of Classification Search
CPC ............................................. F16H 2057/0087
See application file for complete search history.

(56) References Cited

U.S. PATENT DOCUMENTS 4,726,259 A * 2/1988 Idler ........................ F16H 1/46
343/882
5,232,412 A * 8/1993 Zheng ...................... F16H 1/32
475/162
(Continued)

FOREIGN PATENT DOCUMENTS

CN 88101439 A 9/1988
CN 201925420 U 8/2011
(Continued)

OTHER PUBLICATIONS

International Search Report for International Application No. PCT/JP2017/021022 dated Sep. 12, 2017.
(Continued)

*Primary Examiner* — Sherry L Estremsky
(74) *Attorney, Agent, or Firm* — Wolf, Greenfield & Sacks, P.C.

(57) ABSTRACT

A planetary gear device configured by combining a plurality of planetary gear mechanisms includes first and second planetary gear mechanisms sharing a carrier, wherein each planetary gear mechanism is composed of an internal gear $I_k$ (k is an integer equal to or larger than 2) and a planetary gear $P_k$ which is engaged with the internal gear $I_k$ and revolves in a circumferential direction of the internal gear, the planetary gear $P_k$ of each planetary gear mechanism is composed of a spur gear in the form of an external gear, the planetary gears $P_k$ of the planetary gear mechanisms share a central axis or have central axes integrally connected to integrally rotate on a common rotation central axis line or are integrated with each other to integrally rotate on the common rotation
(Continued)

| TARGET REDUCTION GEAR RATIO | NUMBER OF TEETH | | | | REDUCTION GEAR RATIO | ADDENDUM MODIFICATION COEFFICIENT | | | | POWER TRANSMISSION EFFICIENCY | | INTER-AXIAL DISTANCE |
|---|---|---|---|---|---|---|---|---|---|---|---|---|
| | $z_{p1}$ | $z_{i1}$ | $z_{p2}$ | $z_{i2}$ | | $x_{p1}$ | $x_{p2}$ | $x_{i1}$ | $x_{i2}$ | BEFORE OPTIMIZATION | AFTER OPTIMIZATION | |
| 50 | 40 | 87 | 36 | 80 | -46.0588 | -0.42593 | -0.26594 | 0.504431 | 0.870753 | 92.0583 | 95.91156 | 24.33097 |
| | 41 | 89 | 37 | 82 | -47.7246 | -0.43294 | -0.2879 | 0.507231 | 0.822325 | 92.0518 | 95.88717 | 24.84052 |
| 100 | 39 | 89 | 36 | 83 | -97.0909 | -0.44184 | -0.33674 | 0.513902 | 0.717692 | 84.4195 | 91.49674 | 25.85624 |
| | 37 | 84 | 34 | 78 | -95.2 | -0.42247 | -0.27267 | 0.505774 | 0.861941 | 83.789 | 91.23963 | 24.32925 |
| 150 | 40 | 87 | 37 | 81 | -153.286 | -0.42666 | -0.26259 | 0.504853 | 0.875237 | 78.2821 | 87.962 | 24.33191 |
| | 39 | 89 | 37 | 85 | -149.682 | -0.53473 | -0.71504 | 0.571487 | -0.1252 | 77.6573 | 87.48957 | 25.9781 |
| 200 | 41 | 86 | 37 | 78 | -198.875 | -0.32265 | 0.217542 | 0.44728 | 1.939525 | 70.7996 | 85.09962 | 23.19617 |
| | 42 | 88 | 38 | 80 | -209 | -0.33176 | 0.196098 | 0.450127 | 1.888446 | 70.4583 | 84.85215 | 23.70735 | central axis line in order to configure the entire planetary gear device as a two-stage gear mechanism, the planetary gear device is configured such that the number of teeth $z_{p1}$ of a first planetary gear constituting the first planetary gear mechanism and the number of teeth $z_{p2}$ of a second planetary gear constituting the second planetary gear mechanism are different from each other, the number of teeth on the internal gear $I_1$ is $z_{i1}$, and the number of teeth on the internal gear $I_2$ is $z_{i2}$, an addendum modification coefficient of the first planetary gear is $x_{p1}$, an addendum modification coefficient of an internal gear which is engaged with the first planetary gear and constitutes the first planetary gear mechanism is $x_{i1}$, an addendum modification coefficient of the second planetary gear is $x_{p2}$, an addendum modification coefficient of an internal gear which is engaged with the second planetary gear and constitutes the second planetary gear mechanism is $x_{i2}$, a power transmission efficiency of the planetary gear device having the addendum modification coefficients $x_{p1}$, $x_{i1}$, $x_{p2}$, and $x_{i2}$ is η, an addendum modification coefficient of the internal gear $I_1$ is $x_{i1}$, and an addendum modification coefficient of the internal gear $I_2$ is $x_{i2}$, and the addendum modification coefficients have relationships in which values selected from combinations of the addendum modification coefficients which maximize or submaximize the power transmission efficiency η within an allowable range of design specifications given in advance are combined.

8 Claims, 18 Drawing Sheets

(51) Int. Cl.
  *F16H 57/08* (2006.01)
  *F16H 1/32* (2006.01)
  *F16H 1/28* (2006.01)
(52) U.S. Cl.
  CPC ............ *F16C 2361/61* (2013.01); *F16H 1/32* (2013.01); *F16H 2001/2872* (2013.01); *F16H 2001/2881* (2013.01); *F16H 2057/0087* (2013.01); *F16H 2057/085* (2013.01)

(56) References Cited

U.S. PATENT DOCUMENTS

| | | | | |
|---|---|---|---|---|
| 7,052,428 | B2* | 5/2006 | Bolz | F16H 1/28 475/149 |
| 2003/0200827 | A1* | 10/2003 | Kajino | F02N 15/02 74/7 R |
| 2013/0085722 | A1* | 4/2013 | James | G06F 30/15 703/1 |
| 2018/0003283 | A1* | 1/2018 | James | F16H 1/28 |

FOREIGN PATENT DOCUMENTS

| | | |
|---|---|---|
| CN | 104214281 A | 12/2014 |
| CN | 105626820 A | 6/2016 |
| DE | 10 2011 108473 A1 | 1/2013 |
| JP | 60-023654 A | 2/1985 |
| JP | 63-145841 A | 6/1988 |
| JP | 07-301288 A | 11/1995 |
| JP | 09-016643 A | 1/1997 |
| JP | 2008-275112 A | 11/2008 |
| WO | WO 2007/017935 A1 | 2/2007 |
| WO | WO 2012/060137 A1 | 5/2012 |

OTHER PUBLICATIONS

Muneharu Morozumi, Yusei Haguruma to Sado Haguruma no Riron to Sekkei Keisanho, 1$^{st}$ Edition. The Nikkan Kogyo Shinbun, Ltd., Apr. 27, 1989. 42 pages.
Extended European Search Report for European Application No. EP 17810326.3 dated Dec. 19, 2019.
Baglioni et al., Influence of the addendum modification on spur gear efficiency. Mechanism and Machine Theory. 2012;49:216-233. DOI:10.1016/j.mechmachtheory.2011.10.007 [retrieved on Oct. 12, 2011].
Kobuse et al., Efficiency optimization of high-reduction-ratio planetary gears for very high power density actuators. 2016 IEEE 25th International Symposium On Industrial Electronics (ISIE). Jun. 8, 2016. pp. 1240-1245. DOI:10.1109/isie.2016.7745072 [retrieved on Nov. 15, 2016].
Mulzer, Systematik hoch ubersetzender koaxialer Getriebe. May 26, 2009. 182 pages. URL:https://d-nb.info/1003233759/34.
Stangl, Methodik zur kinematischen und kinetischen Berechung mehrwelliger Planeten-Koppelgetriebe. Apr. 5, 2006. 156 pages. URL:https://mediatum.ub.tum.de/doc/1169581/706157.pdf [retrieved on Jun. 29, 2017].
Chinese Office Action dated Jan. 25, 2021 in connection with Chinese Application No. 201780034752.1.
CN 201780034752.1, Jan. 25, 2021, Chinese Office Action.

* cited by examiner

FIG. 5

| | $Z_{i1}$ | $Z_{p1}$ | $Z_{i2}$ | $Z_{p2}$ | carrier |
|---|---|---|---|---|---|
| ALL ARE ROTATED $n_A$ TIMES | $n_A$ | $n_A$ | $n_A$ | $n_A$ | $n_A$ |
| CARRIER IS FIXED AND $Z_{i2}$ IS ROTATED $-n_A$ TIMES | $-n_A \cdot \dfrac{Z_{i2}}{Z_{p2}} \cdot \dfrac{Z_{p1}}{Z_{i1}}$ | $-n_A \cdot \dfrac{Z_{i2}}{Z_{p2}}$ | $-n_A$ | $-n_A \cdot \dfrac{Z_{i2}}{Z_{p2}}$ | 0 |
| SUM | $n_A\left(1 - \dfrac{Z_{i2}}{Z_{p2}} \cdot \dfrac{Z_{p1}}{Z_{i1}}\right)$ | $n_A\left(1 - \dfrac{Z_{i2}}{Z_{p2}}\right)$ | 0 | $n_A\left(1 - \dfrac{Z_{i2}}{Z_{p2}}\right)$ | $n_A$ |

FIG. 7

| TARGET REDUCTION GEAR RATIO | NUMBER OF TEETH | | | | REDUCTION GEAR RATIO | ADDENDUM MODIFICATION COEFFICIENT | | | | POWER TRANSMISSION EFFICIENCY | | INTER-AXIAL DISTANCE |
|---|---|---|---|---|---|---|---|---|---|---|---|---|
| | $z_{p1}$ | $z_{i1}$ | $z_{p2}$ | $z_{i2}$ | | $x_{p1}$ | $x_{p2}$ | $x_{i1}$ | $x_{i2}$ | BEFORE OPTIMIZATION | AFTER OPTIMIZATION | |
| 50 | 40 | 87 | 36 | 80 | -46.0588 | -0.42593 | -0.26594 | 0.504431 | 0.870753 | 92.0583 | 95.91156 | 24.33097 |
| 50 | 41 | 89 | 37 | 82 | -47.7246 | -0.43294 | -0.2879 | 0.507231 | 0.822325 | 92.0518 | 95.88717 | 24.84052 |
| 100 | 39 | 89 | 36 | 83 | -97.0909 | -0.44184 | -0.33674 | 0.513902 | 0.717692 | 84.4195 | 91.49674 | 25.85624 |
| 100 | 37 | 84 | 34 | 78 | -95.2 | -0.42247 | -0.27267 | 0.505774 | 0.861941 | 83.789 | 91.23963 | 24.32925 |
| 150 | 40 | 87 | 37 | 81 | -153.286 | -0.42666 | -0.26259 | 0.504853 | 0.875237 | 78.2821 | 87.962 | 24.33191 |
| 150 | 39 | 89 | 37 | 85 | -149.682 | -0.53473 | -0.71504 | 0.571487 | -0.1252 | 77.6573 | 87.48957 | 25.9781 |
| 200 | 41 | 86 | 37 | 78 | -198.875 | -0.32265 | 0.217542 | 0.44728 | 1.939525 | 70.7996 | 85.09962 | 23.19617 |
| 200 | 42 | 88 | 38 | 80 | -209 | -0.33176 | 0.196098 | 0.450127 | 1.888446 | 70.4583 | 84.85215 | 23.70735 |

PLANETARY GEAR DEVICE AND PLANETARY GEAR DEVICE DESIGN PROGRAM

TECHNICAL FIELD

The present invention relates to a planetary gear device and a planetary gear device design program.

Priority is claimed on Japanese Patent Application No. 2016-112434, filed Jun. 6, 2016, the content of which is incorporated herein by reference.

BACKGROUND ART

As a speed decreasing (increasing) gear constituting various driving systems or power transmission systems, such as industrial machinery, vehicles, robots, and office automation equipment, a planetary gear mechanism composed of a sun gear, a planetary gear, an internal gear, and a carrier is known (refer to Non-Patent Literature 1, for example). A planetary gear mechanism can realize a relatively high reduction gear ratio, has a relatively compact mechanism or structure for a reduction gear ratio and a transfer torque, and includes an input shaft and an output shaft which can be arranged coaxially and thus is widely used in driving systems or power transmission systems such as a wide variety of driving devices or power transmission devices.

As planetary gear mechanisms, for example, a simple planetary gear mechanism, a Ravigneaux planetary gear mechanism, a compound planetary gear mechanism, a magical planetary gear mechanism, and the like are known. Since a gear mechanism having a high efficiency, a high torque, and a high gear reduction ratio is in demand in various industrial apparatuses and consumer equipment, in general, gear mechanisms such as a wave gear mechanism (harmonic gear) and a cycloidal gear mechanism have been developed and put into use in addition to planetary gear mechanisms.

Reduction gear ratios obtained by such a variety of gear mechanisms are generally considered to be as follows.

(1) Simple planetary gear mechanism (first gear): reduction gear ratio of about 1/4 to 1/10

(2) Ravigneaux planetary gear mechanism (first gear): reduction gear ratio of about 1/10

(3) Compound planetary gear mechanism: reduction gear ratio of about 1/100

(4) Magical planetary gear mechanism: reduction gear ratio of about 1/100

(5) Wave gear mechanism: reduction gear ratio of 1/30 to 1/200

(6) Cycloidal gear mechanism: reduction gear ratio of 1/60 to 1/200

Among such a variety of gear mechanisms, the magical planetary gear mechanism, the wave gear mechanism, and the cycloidal gear mechanism have configurations using gears having relatively special structures, and thus problems such as deterioration of productivity, difficulty in improvement of a degree of freedom of design, difficulty in improvement of structural strength, increase in manufacturing costs, and the like arise. Accordingly, a planetary gear mechanism such as the simple planetary gear mechanism using a general-purpose spur gear is considered to be more desirable in terms of productivity, manufacturing costs, a degree of freedom of design, structural strength, and the like. Particularly, the compound planetary gear mechanism configured by combining a plurality of planetary gear mechanisms can realize a reduction gear ratio of about 1/100, as described above, and thus is considered to be desirably employed as a gear mechanism of a planetary gear device which requires a high reduction gear ratio.

On the other hand, since a plurality of planetary gears engaged with an internal gear and a sun gear are arranged in a circumferential direction in the planetary gear mechanism, three conditions of a coaxial condition, an assembly condition, and an adjacency condition are generally considered as restrictions or design conditions for mechanistically establishing the planetary gear mechanism. The coaxial condition is a condition for coaxially locating the shaft centers of the sun gear, the internal gear, and the carrier, the assembly condition is a condition for engaging a plurality of planetary gears arranged at equal intervals with respect to the sun gear and the internal gear, and the adjacency condition is a condition for preventing adjacent planetary gears from interfering with each other.

FIG. 17 is a schematic diagram showing a conventional configuration pertaining to a planetary gear mechanism composed of a sun gear, a planetary gear, an internal gear, and a carrier. FIG. 18 is a schematic diagram showing another conventional configuration pertaining to a planetary gear mechanism composed of a sun gear, a planetary gear, an internal gear, and a carrier. FIG. 19 is a schematic diagram showing a conventional configuration pertaining to a compound planetary gear mechanism configured by combining a plurality of sets of planetary gear mechanisms composed of a sun gear, a planetary gear, an internal gear, and a carrier. FIG. 20 is a schematic diagram showing a conventional configuration pertaining to a compound planetary gear mechanism configured by combining a plurality of sets of planetary gear mechanisms composed of a sun gear, a planetary gear, and a carrier without including an internal gear.

FIG. 17 shows a configuration of a simple planetary gear mechanism. When the number of teeth on a sun gear S is set to $z_s$, the number of teeth on a planetary gear P is set to $z_p$, the number of teeth on an internal gear I is set to $z_i$, the number of planetary gears is set to N (natural number), the internal gear I is fixed, the sun gear S is set to an internal shaft, and a carrier H is set to an output shaft, the reduction gear ratio, the coaxial condition, the assembly condition, and the adjacency condition of the planetary gear mechanism are represented by the following expression (1). Meanwhile, a sign K refers to a sun gear in a broad sense which includes the sun gear S and the internal gear I shown in FIG. 17, and the planetary gear mechanism shown in FIG. 17 belongs to the most common 2K-H type.

[Math. 1]

$$\text{Reduction gear ratio: } \frac{z_s}{z_i + z_c} \quad (1)$$

Coaxial condition: $z_s + 2z_p = z_i$

Assembly condition: $= (z_i + z_s)/N = $ integer number

Adjacency condition: $z_p + 2 < 2(z_s + z_p)\sin(\pi/N)$

FIG. 18 shows a configuration of a Ravigneaux planetary gear mechanism. When the number of teeth on a sun gear S is set to $z_s$, the number of teeth on a radially outward planetary gear P1 is set to $z_{p1}$, the number of teeth on a radially inward planetary gear P2 is set to $z_{p2}$, the number of teeth on an internal gear I is set to $z_i$, the number of planetary gears P1 and P2 is set to 2N, the internal gear I is fixed, the sun gear S is set to an internal shaft, and a carrier H is set to an output shaft, the reduction gear ratio, the coaxial condition, the assembly condition, and the adjacency condition of the planetary gear mechanism are represented by the following expression (2). Meanwhile, in the Ravigneaux planetary gear mechanism, since the radially inward planetary gear P2 reverses a rotation direction, the sun gear S and the internal gear I rotate in the same direction on the basis of the carrier H, and thus the sign of the number $z_s$ of teeth of the sun gear S is inverted in the denominator in expression (2) representing the reduction gear ratio. Further, the adjacency condition is defined by a plurality of expressions, but this means that the adjacency condition is satisfied by any of the expressions being suitable.

[Math. 2]

Reduction gear ratio: $-z_s/(z_i-z_s)$

Coaxial condition: $z_s+2\max(z_{p1},z_{p2})+2<z_i<z_s+2(z_{p1}+z_{p2})$

Assembly condition: $(z_i-z_s)/N=\text{integer}$

Adjacency condition: $z_{p1}+2<(z_i-z_{p1})\sin(\pi/N)$ $z_{p2}+2<(z_s+z_{p2})\sin(\pi/N)$ and $(z_{p1}+z_{p2}+2)^2<(z_s+z_{p2})^2+(z_i-z_{p2})^2-2(z_s+z_{p2})(z_i-z_{p1})\cos(2\pi/N-\phi)$ provided that $\phi=\arccos(((z_s+z_{p2})^2+(z_i-z_{p1})^2-(z_{p1}+z_{p2})^2)/2(z_s+z_{p3})(z_i-z_{p1}))$ (2)

In expression (2), $\varphi$ is an angle at which a straight line connecting the central axis of the sun gear S and the central axis of the planetary gear P1 and a straight line connecting the central axis of the sun gear S and the central axis of the planetary gear P2 intersect.

Although the planetary gear devices shown in FIGS. 17 and 18 are configured by gear trains in the same structural plane, a compound planetary gear mechanism configured in such a manner that planetary gear mechanisms are arranged at intervals in the direction of a rotation axis within a structural plane may be conceived as a gear mechanism which can be desirably employed because it realizes a high reduction gear ratio compared to the simple planetary mechanism and the Ravigneaux planetary gear mechanism, as described above. However, since juxtaposed planetary gear mechanisms need to satisfy the above-described three conditions in the compound planetary gear mechanism, it is very difficult to practically realize a high reduction gear ratio upon satisfying the aforementioned design conditions. Accordingly, configurations of a compound planetary gear mechanism intended to alleviate the design conditions of planetary gear mechanisms have been proposed in Patent Literatures 1 to 3, for example.

The compound planetary gear mechanism disclosed in Patent Literature 1 includes two sets of planetary gear mechanisms each having a sun gear, a planetary gear, and an internal gear and has a configuration in which design conditions are alleviated by coaxially and integrally connecting the planetary gears of the planetary gear mechanisms and using a shifted gear. In addition, the compound planetary gear mechanism disclosed in Patent Literature 2 has a configuration in which design conditions are alleviated by connecting two sets of planetary gear mechanisms each having a sun gear, a planetary gear, and an internal gear and axially non-symmetrically arranging the planetary gears.

FIG. 19 is a schematic diagram showing a configuration of the compound planetary gear mechanism disclosed in Patent Literature 3. The compound planetary gear mechanism of Patent Literature 3 has a configuration in which a degree of freedom of design is improved by connecting sun gears S1 and S2 of two sets of planetary gear mechanisms to each other and independently supporting or bearing spindles and shaft bearings of the planetary gears P1 and P2 according to a common carrier H, as shown in FIG. 19.

Although all the above-described planetary gear mechanisms in various forms have a representative planetary gear mechanism configuration including an internal gear, a compound planetary gear mechanism in a form including no internal gear is known as a planetary gear mechanism in another form, as shown in FIG. 20.

The compound planetary gear mechanism shown in FIG. 20 can be recognized as a planetary gear mechanism having a configuration in which the internal gear I (FIG. 18) in the Ravigneaux planetary gear mechanism shown in FIG. 18 is replaced by a sun gear S2 (FIG. 20). In the compound planetary gear mechanism shown in FIG. 20, sun gears S1 and S2 rotate in an opposite direction relative to the carrier H.

When the number of teeth on the sun gear S1 is set to $z_{s1}$, the number of teeth on the sun gear S2 is set to $z_{s2}$, the number of teeth on a planetary gear P1 is set to $z_{p1}$, the number of teeth on a planetary gear P2 is set to $z_2$, the number of planetary gears P1 and P2 is set to 2N, the sun gear S2 is fixed, the sun gear S1 is set to an internal shaft, and a carrier H is set to an output shaft, the reduction gear ratio, the coaxial condition, the assembly condition, and the adjacency condition of the planetary gear mechanism are represented by the following expression (3). Meanwhile, the adjacency condition is defined by a plurality of expressions, such as expression (3), but this means that the adjacency condition is satisfied by any of the expressions. Further, in the expression below, $\varphi$ is an angle at which a straight line connecting the central axes of the sun gears S1 and S2 and the central axis of the planetary gear P1 and a straight line connecting the central axes of the sun gears S1 and S2 and the central axis of the planetary gear P2 intersect.

[Math. 3]

Reduction gear ratio: $z_s/(z_i+z_s)$

Coaxial condition: $z_s+2z_p=z_i$

Assembly condition: $(z_i+z_s)/N=\text{integer}$

Adjacency condition: $z_p|2<2(z_s|z_p)\sin(\pi/N)$

Reduction gear ratio: $z_{s1}/(z_{s1}+z_{s2})$

Coaxial condition: $z_{s1}+2<z_{s2}\geq z_{s1}+2z_{p2}$

Assembly condition: $(z_{s1}+z_{s2})/N=\text{integer}$

Adjacency condition: $z_{p1}+2<(z_{s2}+z_{p1})\sin(\pi/N)$, $z_{p2}+2<(z_{s1}+z_{p2})\sin(\pi/N)$, and $(z_{p1}+z_{p2}+2)^2<(z_{s1}+z_{p2})^2+(z_{s2}+z_{p1})^2-2(z_s+z_{p2})(z_{s2}+z_{zp1})\cos(2\pi/N-\phi)$ provided that $\phi=\arccos(((z_s+z_{p2})^2+(z_{s2}+z_{p1})^2-(z_{p1}+z_{p2})^2)/2(z_{s1}+z_{p2})(z_{s2}+z_{p1}))$ (3)

In addition, a compound planetary gear mechanism including two planetary gears which share a central axis and have different numbers of teeth is disclosed in Patent Literature 4 and the like as a modification of the planetary gear mechanism shown in FIG. 20.

CITATION LIST

Patent Literature

[Patent Literature 1]
Japanese Patent Republication No. WO2007-017935
[Patent Literature 2]
Japanese Unexamined Patent Application, First Publication No. 2008-275112
[Patent Literature 3]
Japanese Patent Republication No. WO2012-060137
[Patent Literature 4]
Japanese Unexamined Patent Application, First Publication No. Hei 7-301288

Non-Patent Literature

[Non-Patent Literature 1]
Kouzi Yada, "Design of Gear Application Mechanisms," Incorporated Association of Mechanical Technology, Feb. 1, 2012

SUMMARY OF INVENTION

Technical Problem

Although a speed decreasing device using a planetary gear mechanism has been mainly used in the technical fields of industrial machinery and vehicles which require a speed decreasing mechanism or joint parts of a robot having a speed decreasing mechanism, and the like, in general, development of a small and lightweight speed decreasing gear including a high reduction gear ratio beyond the design limits of conventional planetary gear mechanisms is required due to recent advancement in industrial technology. For example, in a speed reducer constituting a power transmission system of a robot, development of a structure or a mechanism which is small and lightweight, can realize a high reduction gear ratio (1/100 to 1/200) and can be manufactured at relatively low cost has been particularly required in recent years.

However, in planetary gear mechanisms, it is difficult to design a small and lightweight planetary gear mechanism having a high reduction gear ratio due to restrictions on the above-described design conditions. In addition, although a reduction gear ratio may be increased to a certain degree according to the compound planetary gear mechanism (FIG. 19 and FIG. 20), it is remarkably difficult to design a small and lightweight planetary gear mechanism having a high reduction gear ratio exceeding 100:1. Further, in a compound planetary gear mechanism, the number of stages of gears is generally set to three or more, and thus power transmission efficiency tends to decrease.

An object of the present invention devised in view of the aforementioned circumstances is to provide a small and lightweight planetary gear device having a simple structure that can be manufactured at relatively low cost and capable of relatively easily allowing a high reduction gear ratio exceeding 100:1 to be realized, the number of stages of gears to be set to two, and the power transmission efficiency to be improved, and a planetary gear device design program.

Solution to Problem

In order to achieve the aforementioned objects, a planetary gear device according to one aspect of the present invention is a planetary gear device which is configured by combining a plurality of planetary gear mechanisms and includes: first and 10 second planetary gear mechanisms sharing a carrier, wherein each of the first and second planetary gear mechanisms is composed of an internal gear $I_k$ (k is an integer equal to or larger than 2) and a planetary gear $P_k$ which is engaged with the internal gear $I_k$ and revolves in the circumferential direction of the internal gear, the planetary gear $P_k$ of each of the first and second planetary gear mechanisms is composed of a spur gear in the form of an external gear, the planetary gears $P_k$ of the first and second planetary gear mechanisms share a central axis or have central axes integrally connected to integrally rotate on a common rotation central axis line, or are integrated with each other to integrally rotate on the common rotation central axis line in order to configure the entire planetary gear device as a two-stage gear mechanism, the planetary gear device is configured such that the number of teeth $z_{p1}$ of a first planetary gear constituting the first planetary gear mechanism and the number of teeth $z_{p2}$ of a second planetary gear constituting the second planetary gear mechanism are different from each other, the number of teeth on the internal gear $I_1$ is $z_{i1}$, the number of teeth on the internal gear $I_2$ is $z_{i2}$, an addendum modification coefficient of the first planetary gear is $x_{p1}$, an addendum modification coefficient of an internal gear which is engaged with the first planetary gear and constitutes the first planetary gear mechanism is $x_{i1}$, an addendum modification coefficient of the second planetary gear is $x_{p2}$, an addendum modification coefficient of an internal gear which is engaged with the second planetary gear and constitutes the second planetary gear mechanism is $x_{i1}$, a power transmission efficiency of the planetary gear device having the addendum modification coefficients $x_{p1}$, $x_{i1}$, $x_{p2}$, and $x_{i2}$ is $\eta$, an addendum modification coefficient of the internal gear $I_1$ is $x_{i1}$, and an addendum modification coefficient of the internal gear $I_2$ is $x_{i2}$, and the addendum modification coefficients have relationships in which values selected from combinations of the addendum modification coefficients which maximize or submaximize the power transmission efficiency $\eta$ within an allowable range of design specifications given in advance are combined.

In addition, the planetary gear device according to one aspect of the present invention may further include a sun gear S1 having a number of teeth $z_{s1}$, wherein each planetary gear $P_k$ is engaged with the sun gear S1, an addendum modification coefficient of the sun gear S1 is $x_{s1}$, and the power transmission efficiency $\eta$ is a combination of values which maximize or submaximize the power transmission efficiency $\eta$, the combination being selected from combinations of the numbers of teeth $z_{s1}$, $z_{p1}$, $z_{p2}$, $z_{i1}$ and $z_{i2}$ on gears and the addendum modification coefficients $x_{s1}$, $x_{p1}$, $x_{p2}$, $x_{i1}$ and $x_{i2}$, when the power transmission efficiency $\eta$ is represented by a combination of the numbers of teeth $z_{s1}$, $z_{p1}$, $z_{p2}$, $z_{i1}$ and $z_{i1}$ on the gears and the addendum modification coefficients $x_{s1}$, $x_{p1}$, $x_{p2}$, $x_{i1}$ and $x_{i2}$.

In addition, in the planetary gear device according to one aspect of the present invention, the power transmission efficiency $\eta$ may be a combination of values which maximize or submaximize the power transmission efficiency $\eta$, the combination being selected from combinations of the numbers of teeth $z_{p1}$, $z_{p2}$, $z_{i1}$ and $z_{i2}$ on gears, the addendum modification coefficients $x_{p1}$, $x_{p2}$, $x_{i1}$ and $x_{i2}$ and an inter-central axis distance coefficient $X_c$, when the power transmission efficiency $\eta$ is represented by a combination of the numbers of teeth $z_{p1}$, $z_{p2}$, $z_{i1}$ and $z_{i2}$ on the gears and the addendum modification coefficients $x_{p1}$, $x_{p2}$, $x_{i1}$ and $x_{i2}$, or a combination of values which maximize or submaximize the power transmission efficiency η, the combination being selected from combinations of the numbers of teeth $z_{p1}$, $z_{p2}$, $z_{i1}$ and $z_{i2}$ on the gears and the addendum modification coefficients $x_{p1}$, $x_{p2}$ and $X_c$, when the power transmission efficiency η is represented by a combination of the numbers of teeth $z_{p1}$, $z_{p2}$, $z_{i1}$ and $z_{i2}$ on the gears, the addendum modification coefficients $x_{p1}$, $x_{p2}$, $x_{i1}$ and $x_{i2}$, and the inter-central axis distance coefficient $X_c$, the inter-central axis distance coefficient $X_c$ being an amount by which an inter-axis distance between the first planetary gear mechanism and the second planetary gear mechanism is shifted.

In addition, in the planetary gear device according to one aspect of the present invention, the power transmission efficiency η ($x_{p1}$, $x_{i1}$, $x_{p2}$, $x_{i2}$ and $X_c$) may be $\eta_0 = \eta_1 - \eta_2$, and the power transmission efficiency $\eta_k$ of the internal gear $I_k$ composed of an internal gear having a number of teeth $z_{ik}$ may be represented by the following expression (1),

[Math. 4]

$$\eta_k = 1 - \mu_k \pi \left( \frac{1}{z_{ik}} - \frac{1}{z_{pk}} \right) \varepsilon_{0k} \quad (1)$$

in expression (1), subscript k represents a gear pair of each planetary gear mechanism, $\mu_k$ is a coefficient of friction between the internal gear $I_k$ and the planetary gear $P_k$, $\varepsilon_{0k}$ denotes a contact ratio of the internal gear $I_k$ and planetary gear $P_k$, and $\varepsilon_{0k}$ is represented by the following expression (2) in expression (1),

[Math. 5]

$$\varepsilon_{0k} = \varepsilon_{1k}^2 + \varepsilon_{2k}^2 + 1 - \varepsilon_{1k} - \varepsilon_{2k} \quad (2)$$

in expression (1), $\varepsilon_{1k}$ is an approach contact ratio, $\varepsilon_{2k}$ is a recess contact ratio, and $\varepsilon_{1k}$ and $\varepsilon_{2k}$ in expression (2) are represented by the following expression (3),

[Math. 6]

$$\varepsilon_{1k} = \frac{z_{ik}}{2\pi}(\tan a_{wk} - \tan a_{z_{ik}})$$

$$\varepsilon_{2k} = \frac{z_{pk}}{2\pi}(\tan a_{pk} - \tan a_{z_{wk}}) \quad (3)$$

in expression (1), $a_{wk}$ is a contact pressure angle, and $a_{zpk}$ and $a_{zik}$ denote addendum pressure angles and are represented by the following expression (4),

[Math. 7]

$$a_{wk} = \cos^{-1}\left( \frac{z_{ik} - z_{pk}}{2r_c} m_k \cos a \right)$$

$$a_{zpk} = \cos^{-1}\left( \frac{d_{bpk}}{d_{apk}} \right)$$

$$a_{zik} = \cos^{-1}\left( \frac{d_{bik}}{d_{aik}} \right) \quad (4)$$

in expression (4), $r_c$ is a distance between the central axes of the internal gear $I_k$ and the planetary gear $P_k$, $m_k$ is a module, a is a standard pressure angle before being shifted, $d_{aik}$ and $d_{apk}$ are addendum circle diameters of the internal gear $I_k$ and the planetary gear $P_k$, $d_{bik}$ and $d_{bpk}$ are standard circle diameters of the internal gear $I_k$ and the planetary gear $P_k$, and $d_{aik}$, $d_{apk}$, $d_{bik}$ and $d_{bpk}$ are represented by the following expression (5),

[Math. 8]

$$d_{apk} = m_k z_{pk} + 2m_k(x_{pk} + x_{ck}) \quad (5)$$

$$d_{ai1} = m_1 z_{i1} - 2m_1(1 - (x_{i1} + x_{c1}))$$

$$d_{ai2} = m_2 z_{i2} - 2m_2(1 - (x_{in} + x_{i2} + x_{c2}))$$

$$d_{bpk} = m_k z_{pk} \cos \alpha$$

$$x_{ck} = \frac{(z_{ik} - z_{pk})(inv(a_{wk}(r_{ck} + X_c)) - inv(a_{wk}(r_{ck})))}{2 \tan a}$$

$$inv(a) = \tan a - a$$

in expression (5), the coefficient $x_{in}$ is an addendum modification coefficient for matching inter-axis distances of the gear pair P1 and I1 and the gear pair P2 and I2, coefficients $x_{c1}$ and $x_{c2}$ are addendum modification coefficients representing the influence of each gear pair which is caused by changing of the inter-axis distance between the gear pair P1 and I1 and the gear pair P2 and I2 by an addendum modification amount $X_c$, and the addendum modification coefficients $x_{p1}$, $x_{p2}$, $x_{i1}$, and $x_{i2}$ have relationships represented by the following expression (6) therebetween,

[Math. 9]

$$x_{i1} - x_{P1} = X_{c1}$$

$$x_{i2} - x_{p2} = x_{in} + x_{c2} \quad (6)$$

wherein inv(a) is an involute function in expression (6).

In addition, in the planetary gear device according to one aspect of the present invention, the planetary gear mechanisms may have a configuration which does not have a sun gear.

In addition, in the planetary gear device according to one aspect of the present invention, the planetary gear mechanisms may have a configuration which has a sun gear.

In order to achieve the aforementioned objects, a planetary gear device design program according to one aspect of the present invention causes a computer for designing a planetary gear device to execute steps, the planetary gear device including a first planetary gear mechanism and a second planetary gear mechanism which share a carrier and each of which is composed of an internal gear I, a planetary gear $P_k$ which is engaged with the internal gear I and revolves in the circumferential direction of the internal gear, and a sun gear S1 having a number of teeth $z_{s1}$, in which the number of teeth on a first planetary gear constituting the first planetary gear mechanism is $z_{p1}$, the number of teeth on a second planetary gear constituting the second planetary gear mechanism is $z_{p2}$, an addendum modification coefficient of the first planetary gear is $x_{p1}$, an addendum modification coefficient of an internal gear which is engaged with the first planetary gear and constitutes the first planetary gear mechanism is $x_{i1}$, an addendum modification coefficient of the second planetary gear is $x_{p2}$, an addendum modification coefficient of an internal gear which is engaged with the second planetary gear and constitutes the second planetary gear mechanism is $x_{i2}$, a power transmission efficiency of the planetary gear device having the addendum modification coefficients $x_{p1}$, $x_{i1}$, $x_{p2}$, and $x_{i2}$ is η, and an addendum modification coefficient of the sun gear S1 is $x_{s1}$, the steps including: a step of generating sets of numbers of gears $z_{s1}$, $z_{p1}$, $z_{p2}$, $z_{i1}$ and $z_{i2}$ which can be generated; a step of setting an initial set among the generated sets of numbers of gears $z_{s1}$, $z_{p1}$, $z_{p2}$, $z_{i1}$ and $z_{i2}$ which can be generated; a step of assigning initial values to a vector $x=(x_{s1}, x_{p1}, x_{p2}, x_{i1}$ and $x_{i2})$; a step of obtaining a gradient vector $v=(\partial \eta / \partial x_{s1},$ $\partial\eta/\partial x_{p1}$, $\partial\eta/\partial x_{p2}$, $\partial\eta/\partial x_{i1}$ and $\partial\eta/\partial x_{s1}$); a step of selecting a vector q which satisfies v·q>0; a step of determining whether an update amount γq of the vector x has sufficiently decreased; a step of adding the update amount γq to the vector x to update the vector x when it is determined that the update amount γq has not sufficiently decreased; a step of selecting a combination of addendum modification coefficients which maximizes or submaximizes the power transmission efficiency η from combinations of the sets of the numbers of gears $z_{s1}$, $z_{p1}$, $z_{p2}$, $z_{i1}$ and $z_{i2}$ and the addendum modification coefficients $x_{s1}$, $x_{p1}$, $x_{p2}$, $x_{i1}$ and $x_{i2}$ when it is determined that the update amount γq has sufficiently decreased; and a step of outputting the selected combination of the sets of the numbers of gears $z_{s1}$, $z_{p1}$, $z_{p2}$, $z_{i1}$ and $z_{i2}$ and the addendum modification coefficients $x_{s1}$, $x_{p1}$, $x_{p2}$, $x_{i1}$ and $x_{i2}$ which maximizes the power transmission efficiency η.

In order to achieve the aforementioned objects, a computer for designing a planetary gear device to execute steps, the planetary gear device including a first planetary gear mechanism and a second planetary gear mechanism which share a carrier and each of which is composed of an internal gear I and a planetary gear $P_k$ which is engaged with the internal gear I and revolves in the circumferential direction of the internal gear, in which the number of teeth on a first planetary gear constituting the first planetary gear mechanism is $z_{p1}$, the number of teeth on a second planetary gear constituting the second planetary gear mechanism is $z_{p2}$, an addendum modification coefficient of the first planetary gear is $x_{p1}$, an addendum modification coefficient of an internal gear which is engaged with the first planetary gear and constitutes the first planetary gear mechanism is $x_{i1}$, an addendum modification coefficient of the second planetary gear is $x_{p2}$, an addendum modification coefficient of an internal gear which is engaged with the second planetary gear and constitutes the second planetary gear mechanism is $x_{i2}$, a power transmission efficiency of the planetary gear device having the addendum modification coefficients $x_{p1}$, $x_{i1}$, $x_{p2}$, and $x_{i2}$ is η, and an inter-central axis distance coefficient which is an amount by which an inter-axis distance between the first planetary gear mechanism and the second planetary gear mechanism is shifted is $X_c$, is caused to execute: a step of generating sets of numbers of gears $z_{p1}$, $z_{p2}$, $z_{i1}$ and $z_{i2}$ which can be generated; a step of setting an initial set among the generated sets of numbers of gears $z_{p1}$, $z_{p2}$, $z_{i1}$ and $z_{i2}$ which can be generated; a step of assigning appropriate initial values to a vector X=($x_{p1}$, $x_{p2}$, $x_{i1}$ and $x_{i2}$) or a vector x=($x_{p1}$, $x_{p2}$ and $X_c$); a step of obtaining a gradient vector v=($\partial\eta/\partial x_{p1}$, $\partial\eta/\partial x_{p2}$, $\partial\eta/\partial x_{i1}$ and $\partial\eta/\partial x_{i2}$) or a gradient vector v=($\partial\eta/\partial x_{p1}$, $\partial\eta/\partial x_{p2}$ and $\partial\eta/\partial X_c$); a step of selecting a vector q which satisfies v·q>0; a step of determining whether an update amount γq of the vector x has sufficiently decreased; a step of adding the update amount γq to the vector x to update the vector x when it is determined that the update amount γq has not sufficiently decreased; a step of selecting a combination of addendum modification coefficients which maximizes or submaximizes the power transmission efficiency η from combinations of the sets of the numbers of gears $z_{p1}$, $z_{p2}$, $z_{i1}$ and $z_{i2}$ and the addendum modification coefficients $x_{p1}$, $x_{p2}$, $x_{i1}$ and $x_{i2}$ or combinations of the sets of the numbers of gears $z_{p1}$, $z_{p2}$, $z_{i1}$ and $z_{i2}$ and the addendum modification coefficients $x_{p1}$, $x_{p2}$ and $X_c$ when it is determined that the update amount γq has sufficiently decreased; and a step of outputting the selected combination of the sets of the numbers of gears $z_{p1}$, $z_{p2}$, $z_{i1}$ and $z_{i2}$ and the addendum modification coefficients $x_{p1}$, $x_{p2}$, $x_{i1}$, and $x_{i2}$ or selected combination of the sets of the numbers of gears $z_{p1}$, $z_{p2}$, $z_{i1}$ and $z_{i2}$ and the addendum modification coefficients $x_{p1}$, $x_{p2}$ and $X_c$ which maximize the power transmission efficiency η.

Advantageous Effects of Invention

According to the present invention, it is possible to provide a small and lightweight planetary gear device having a simple structure that can be manufactured at relatively low cost and capable of relatively easily realizing a high reduction gear ratio exceeding 100:1, setting the number of stages of gears to two, and improving power transmission efficiency.

BRIEF DESCRIPTION OF DRAWINGS

FIG. 5 is a table showing a calculation result of a superposition method for obtaining a velocity ratio.

FIG. 7 is a table showing a result obtained by optimizing an addendum modification coefficient to maximize transmission efficiency.

DESCRIPTION OF EMBODIMENTS

Hereinafter, suitable embodiments of the present invention will be described in detail with reference to the attached drawings.

Figure 1:
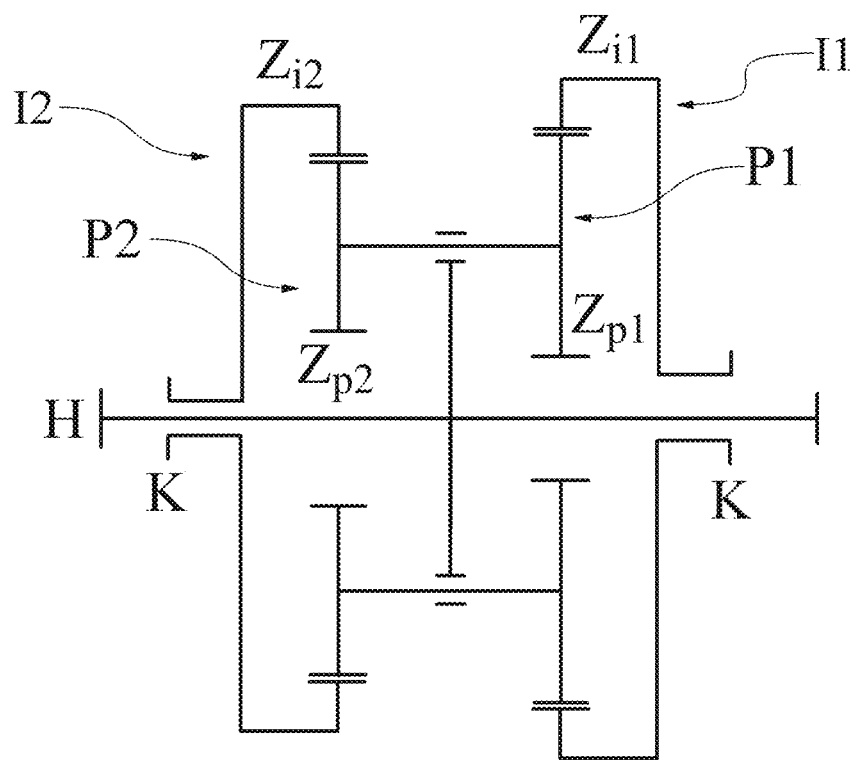
FIG. 1 is a schematic diagram showing a configuration of a compound planetary gear mechanism according to the present embodiment.
Figure 2:
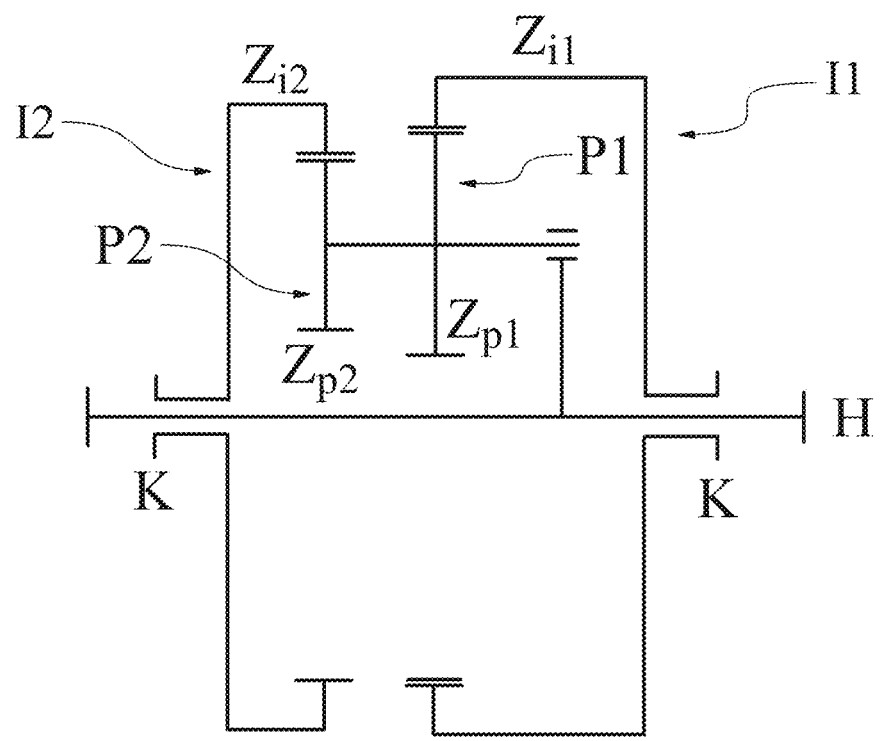
FIG. 2 is a schematic diagram showing a modified example of the compound planetary gear mechanism shown in FIG. 1.
Figure 3:
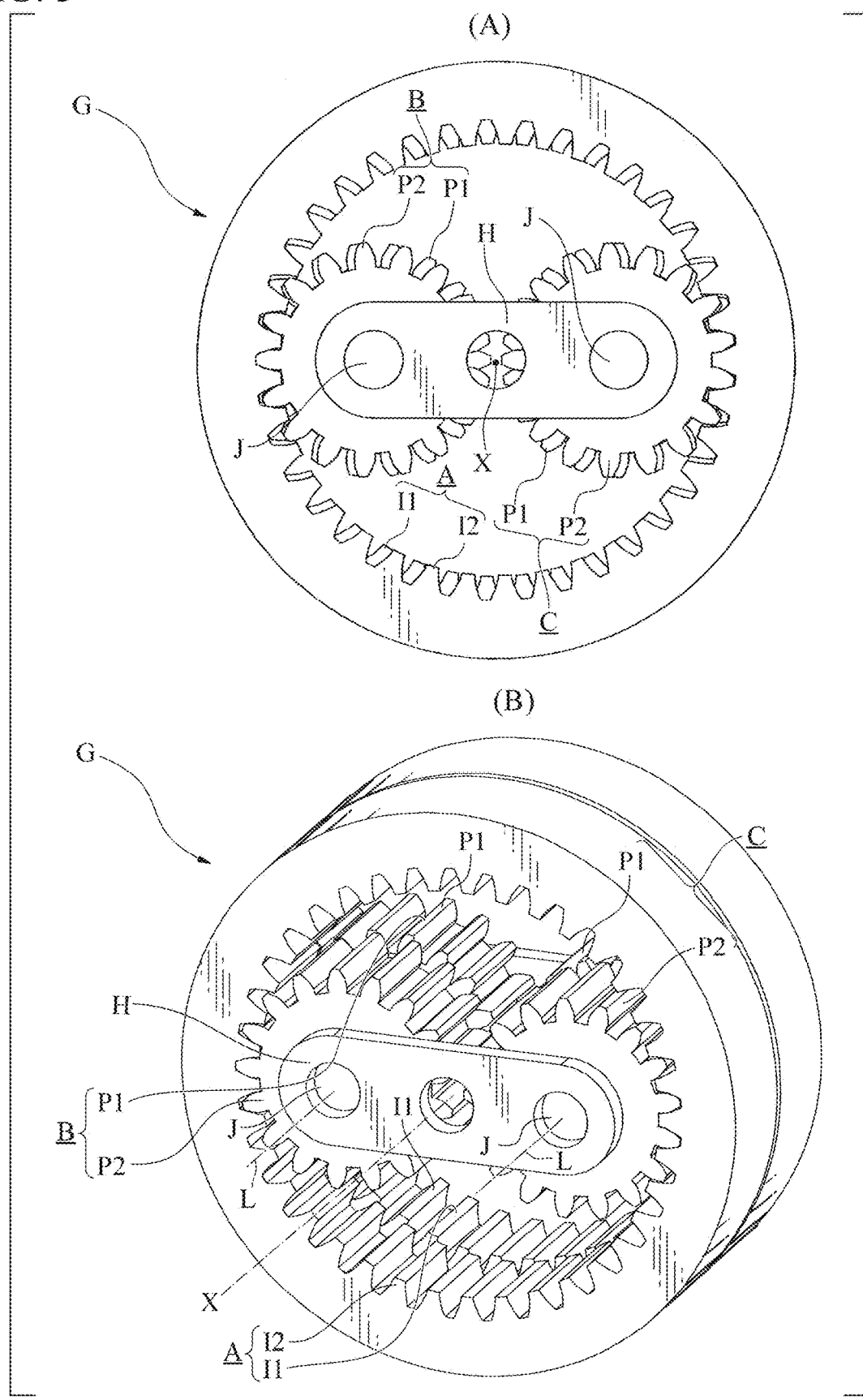
FIG. 3 is a front view and a perspective view schematically showing a structure of the compound planetary gear mechanism shown in FIG. 1.

FIG. 1 is a schematic diagram showing a configuration of a compound planetary gear mechanism according to the present embodiment and FIG. 2 is a schematic diagram showing a modified example of the compound planetary gear mechanism shown in FIG. 1. In addition, FIG. 3 is a front view and a perspective view schematically showing the structure of the compound planetary gear mechanism shown in FIG. 1. Further, FIG. 3(A) is a front view schematically showing the structure of the compound planetary gear mechanism shown in FIG. 1, and FIG. 3(B) is a perspective view schematically showing the structure of the compound planetary gear mechanism shown in FIG. 1.

FIGS. 1 and 2 show a compound planetary gear mechanism G (2K-H type) having a configuration using internal gears I1 and I2. The compound planetary gear mechanism G includes the internal gears I1 and I2, a common carrier H, and planetary gears P1 and P2 rotatably borne by the carrier H. The planetary gears P1 and P2 share a central axis and have different numbers of teeth. The planetary gears P1 and P2 integrally rotate. A method of optimizing a power transmission efficiency η according to the present embodiment will be described by using the 2K-H type compound planetary gear mechanism as an example.

The structure of the compound planetary gear mechanism G as shown in FIG. 1 is schematically shown in FIG. 3. As shown in FIG. 3, an internal tooth gear A includes the internal gears I1 and I2. A first planetary gear mechanism B includes a planetary gear P1 (first planetary gear) and a planetary gear P2 (first planetary gear). A second planetary gear mechanism C includes a planetary gear P1 (first planetary gear) and a planetary gear P2 (first planetary gear). The carrier H supports a plurality of spindles J arranged at intervals in the circumferential direction. Each spindle J coaxially and rotatably bears the planetary gears P1 and P2 of the first planetary gear mechanism B and the second planetary gear mechanism B by a spindle bearing (not shown). The planetary gears P1 and P2 of each of the first planetary gear mechanism B and the second planetary gear mechanism C are engaged with internal gears I1 and I2 composed of spur gears. That is, the planetary gears P1 and P2 of each of the first planetary gear mechanism B and the second planetary gear mechanism C are rotatably borne by the common carrier H and engaged with the internal gears I1 and I2 to revolve. For example, an output shaft (not shown) of a rotation driving source is integrally connected to the carrier H, and a power transmission shaft (not shown) of a driven system apparatus is integrally connected to the internal gear I1. The carrier H, the output shaft, and the power transmission shaft rotate on a rotation central axis line X-X'. In addition, to constitute the entire planetary gear device as a two-stage gear mechanism, the planetary gears P1 and P2 share a central axis such that they integrally rotate on a common rotation central axis line L or central axes thereof are integrally connected, or the planetary gears P1 and P2 are integrated with each other such that they integrally rotate on the common rotation central axis line L.

Since the revolution radius of the planetary gears P1 and P2 of each of the first planetary gear mechanism B and the second planetary gear mechanism B can be reduced by using the internal gears I1 and I2 in this manner and thus the centrifugal force applied to the planetary gears P1 and P2 when the carrier H rotates at a high speed can be decreased, a radial load of a shaft bearing (not shown) which bears the planetary gears P1 and P2 can be reduced. In addition, according to the compound planetary gear mechanism G using the internal gears I1 and I2, the torque of the rotation driving source can be output to the driven system apparatus according to a rotation element having a relatively large diameter, that is, the internal gears I1 and I2. Accordingly, the compound planetary gear mechanism G in this configuration can be suitably used for a power transmission system which transmits a large torque.

In the planetary gear mechanism G having the above-described configuration, when the number of teeth on the internal gear I1 is set to $z_{i1}$, the number of teeth on the internal gear I2 is set to $z_{i2}$, the number of teeth on the planetary gear P1 is set to $z_{p1}$, the number of teeth on the planetary gear P2 is set to $z_{p2}$, the module of the internal gear I1 and the planetary gear P1 is set to $m_1$, the module of the internal gear I2 and the planetary gear P2 is set to $m_2$, the number of planetary gears P1 and P2 is set to 2N (N is a natural number, the same applies in the following), the internal gear I2 is fixed, the carrier H is used as input means, and the internal gear I1 is used as output means, the reduction gear ratio of the planetary gear mechanism G is represented by the following expression (4).

[Math. 10]

$$\frac{z_{i1}/z_{p1} - z_{i2}/z_{p2}}{z_{i1}/z_{p1}} \quad (4)$$

That is, if a difference between the pitch radiuses of the internal gear I1 and the internal gear I2 can be set to a very small value, a significantly large reduction gear ratio is obtained. Here, a coaxial condition when the second planetary gear mechanism (the planetary gear P2 and the internal gear I2) is shifted is represented by the following expression (5).

[Math. 11]

$$m_1(z_{i1}-z_{p1})-m_2(z_{i2}-z_{p2}+2y) \quad (5)$$

In expression (5), y is a center distance increase coefficient according to dislocation of a gear and is a numerical value given by the following expression (6).

[Math. 12]

$$y = \frac{z_{i2} - z_{p2}}{2}\left(\frac{\cos\alpha_c}{\cos\alpha_b} - 1\right) \quad (6)$$

In expression (6), $\alpha_c$ is a pressure angle of a standard gear, $\alpha_b$ is a pressure angle of a shifted gear, and these pressure angles are values which satisfy the following expression (7).

[Math. 13]

$$inv\alpha_b = inv\alpha_c + \frac{x_{i2} - x_{p2}}{z_{i2} - z_{p2}}\tan\alpha_c \quad (7)$$

In addition, in expression (7), $x_{i2}$ and $x_{p2}$ are addendum modification coefficients of the internal gear I2 and the planetary gear P2 constituting the second planetary gear mechanism. Further, $inv(\alpha)$ is an involute function.

The assembly condition is established by setting a phase difference between teeth of the planetary gear P1 and the planetary gear P2 as follows. That is, when N planetary gears P1 are arranged at equal intervals in the circumferential direction at the inside of the internal gear I1, an engagement phase (pitch) between the internal gear I1 and an n-th planetary gear P1 is represented by the following expression (8) on the basis of an engagement phase between the internal gear I1 and a 0-th planetary gear P1.

[Math. 14]

$$\frac{z_{i1} \bmod N}{N}n \quad (8)$$

In the same manner, an engagement phase between the internal gear I2 and an n-th planetaiy gear P2 is represented by the following expression (9) on the basis of an engagement phase between the internal gear I2 and a 0-th planetary gear P2.

[Math. 15]

$$\frac{z_{i2} \bmod N}{N}n \quad (9)$$

Accordingly, it is desirable that the planetary gears P1 and P2 be assembled such that the phase of the n-th planetary gear P1 and the phase of the planetary gear P2 are suitable for the following expression (10).

[Math. 16]

$$1 - \frac{z_{i1} \bmod N}{N}n \quad (10)$$
$$1 - \frac{z_{i2} \bmod N}{N}n$$

In addition, the adjacency condition is represented by the following expression (11).

[Math. 17]

$$z_{p1}+2<(z_{i1}-z_{p1})\sin(\pi/N)$$
$$z_{p2}+2<(z_{i2}-z_{p2})\sin(\pi/N) \quad (11)$$

In the present embodiment, a combination of $z_{i1}$=90, $z_{i2}$=80, $z_{P1}$=28, $z_{P3}$=25, N=5, $\alpha_c$=20 deg, $x_1$-$x_2$=-0.586035 can be employed by setting module $m_1$=1 and $m_2$=1.154545 (DP22) using a diametral pitch (DP) for module $m_2$, constituting the second planetary gear mechanism (the planetary gear P2 and the sun gear S2) by a diametral pitch gear and dislocating the second planetary gear mechanism to satisfy the coaxial condition. As a result, a reduction gear ratio of 1/225 is obtained. Such a reduction gear ratio is a very high reduction ratio that cannot be obtained in conventional planetary gear mechanisms. Meanwhile, $x_1$ is -0.2930175 and $x_2$ is 0.2930175.

As described above, according to the compound planetary gear mechanism G having the above-described configuration, a very high reduction gear ratio exceeding 1/200 can be achieved in a two-stage gear mechanism. However, when such a very high reduction gear ratio is secured, although power loss is relatively small because there is a two-stage gear mechanism configuration, a problem that the power transmission efficiency η considerably decreases is generated. Accordingly, in the compound planetary gear mechanism G according to the present invention, the power transmission efficiency η is maximized according to optimization of addendum modification coefficients to improve the power transmission efficiency η. Hereinafter, optimization of the addendum modification coefficients and maximization of the power transmission efficiency η (hereinafter referred to as "transmission efficiency η") will be described.

(1) Regarding Derivation of Transmission Efficiency of Planetary Gear Mechanism (1-1) Transmission Efficiency of Internal Gear Pair Prior to calculation of the general transmission efficiency η of the compound planetary gear mechanism C a method of calculating transmission efficiency of a spur gear and an internal gear is described. In general, transmission efficiency $\eta_k$ of a planetary gear $P_k$ composed of a spur gear having the number of teeth on $z_{pk}$ and an internal gear $I_k$ composed of an internal gear having the number of teeth on $z_{ik}$ is represented by the following expression (12).

[Math. 18]

$$\eta_k = 1 - \mu_k\pi\left(\frac{1}{z_{ik}} - \frac{1}{z_{pk}}\right)\varepsilon_{0k} \quad (12)$$

Since the compound planetary gear mechanism G is composed of two sets of planetary gear mechanisms, subscript k such as in the numbers of teeth $z_{pk}$ and $z_{ik}$ in expression (12) represents a gear pair of each planetary gear mechanism, and k=1 or 2.

In expression (12), $\mu_k$ is a coefficient of friction between the internal gear $I_k$ and the planetary gear $P_k$, and $\varepsilon_{0k}$ denotes a contact ratio of the internal gear $I_k$ and the planetary gear $P_k$. The contact ratio $\varepsilon_{0k}$ can be calculated according to the following expression (13) using an approach contact ratio $\varepsilon_{1k}$ and a recess contact ratio $\varepsilon_{2k}$.

[Math. 19]

$$\eta_k = 1 - \mu_k \pi \left( \frac{1}{z_{ik}} - \frac{1}{z_{pk}} \right) \varepsilon_{0k} \quad (13)$$

In addition, the approach contact ratio $\varepsilon_{1k}$ and the recess contact ratio $\varepsilon_{2k}$ are represented by the following expression (14). In expression (14), $a_{wk}$ is a contact pressure angle of the internal gear $I_k$ and the planetary gear $P_k$, and $a_{zpk}$ and $a_{zik}$ denote addendum pressure angles of the internal gear $I_k$ and the planetary gear $P_k$.

[Math. 20]

$$\varepsilon_{1k} = \frac{z_{ik}}{2\pi}(\tan a_{wk} - \tan a_{z_{ik}})$$
$$\varepsilon_{2k} = \frac{z_{pk}}{2\pi}(\tan a_{z_{pk}} - \tan a_{wk}) \quad (14)$$

The contact pressure angle $a_{wk}$ and the addendum pressure angles $a_{zpk}$ and $a_{zik}$ in expression (14) are represented by the following expression (15).

[Math. 21]

$$a_{wk} = \cos^{-1}\left( \frac{z_{ik} - z_{pk}}{2r_c} m_k \cos a \right)$$
$$a_{z_{pk}} = \cos^{-1}\left( \frac{d_{bpk}}{d_{apk}} \right)$$
$$a_{z_{ik}} = \cos^{-1}\left( \frac{d_{bik}}{d_{aik}} \right) \quad (15)$$

Figure 4:
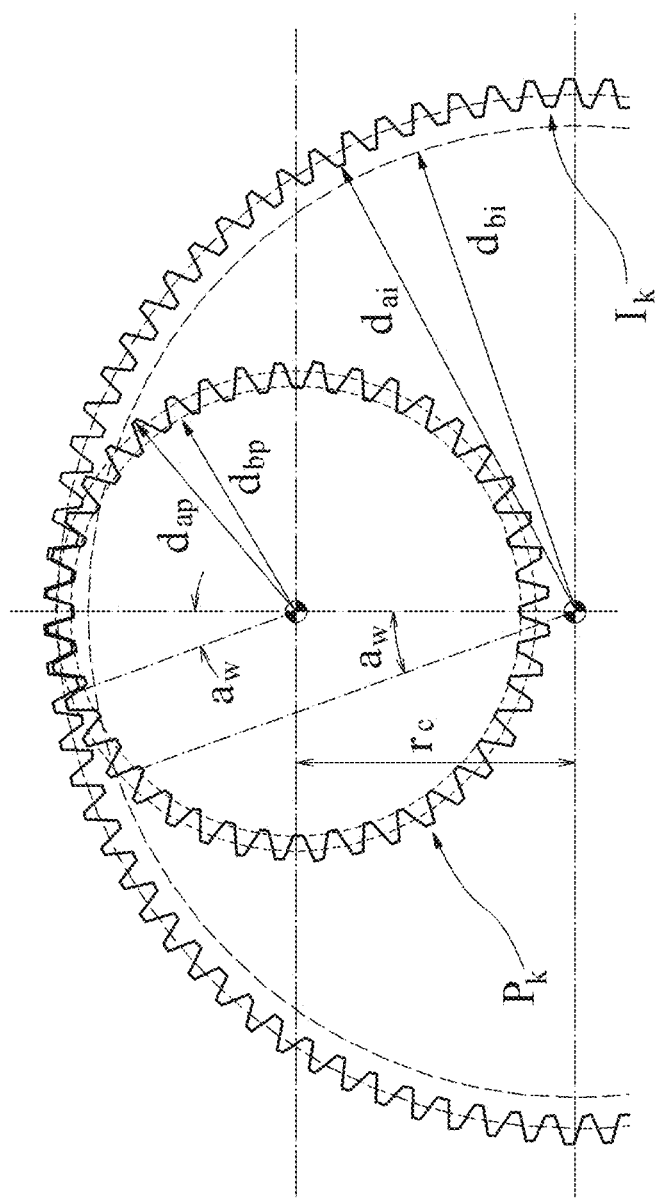
FIG. 4 is a schematic diagram showing an engagement relationship between an internal gear and a planetary gear.

In expression (15), $r_c$ is a distance between the central axes of the internal gear $I_k$ and the planetary gear $P_k$ (common in the internal gear I1 and the planetary gear P1 and the internal gear I2 and the planetary gear P2), $m_k$ is a module, and a is a standard pressure angle (before being shifted). In addition, in the above expression, $d_{aik}$ and $d_{apk}$ are addendum circle diameters of the internal gear $I_k$ and the planetary gear $P_k$, and $d_{bik}$ and $d_{bpk}$ are standard circle diameters of the internal gear $I_k$ and the planetary gear $P_k$. FIG. 4 is a schematic diagram showing an engagement relationship between the internal gear $I_k$ and the planetary gear $P_k$. In FIG. 4, relationships of the aforementioned parameters $r_{ck}$, $a_{wk}$, $d_{aik}$, $d_{apk}$, $d_{bik}$ and $d_{bpk}$ are illustrated in detail (however, subscript k is omitted).

(1-2) Transmission Efficiency of Planetary Gear Mechanism

In general, the transmission efficiency $\eta$ of the planetary gear mechanism is represented by the following expression (16). In expression (16), $M_{out}$ and $M_{in}$ are an output torque and an input torque, and $\omega_{out}$ and $\omega_{in}$ are an output angular velocity and an input angular velocity. As represented by expression (16), the transmission efficiency $\eta$ is obtained by multiplication of a torque ratio and a velocity ratio. Accordingly, it is possible to obtain the transmission efficiency $\eta$ by calculating the velocity ratio and the torque ratio.

[Math. 22]

$$a_{wk} = \cos^{-1}\left( \frac{z_{ik} - z_{pk}}{2r_c} m_k \cos a \right)$$
$$a_{z_{pk}} = \cos^{-1}\left( \frac{d_{bpk}}{d_{apk}} \right)$$
$$a_{z_{ik}} = \cos^{-1}\left( \frac{d_{bik}}{d_{aik}} \right) \quad (16)$$

(i) Calculation of Velocity Ratio

FIG. 5 is a table showing a calculation result of a superposition method for obtaining a velocity ratio. FIG. 5 shows a calculation result obtained by setting the carrier H to an input element, setting the internal gear I2 to a fixed element, setting the internal gear I1 to an output element in the compound planetary gear mechanism G shown in FIG. 1, and applying a superposition method thereto. The velocity ratio can be represented by the following expression (17) according to the calculation result shown in

[Math. 23]

$$\frac{\omega_{out}}{\omega_{in}} = \frac{\omega_{zi1}}{\omega_{carrier}} = \frac{n_A\left(1 - \frac{z_{i2}}{z_{p2}} \cdot \frac{z_{p1}}{z_{i1}}\right)}{n_A} 1 - i_0 \quad (17)$$

provided that $i_0 = \frac{z_{i2}}{z_{p2}} \cdot \frac{z_{p1}}{z_{i1}}$

Meanwhile, in expression (17), $\omega_{zi1}$ is the angular velocity of the internal gear I1, $\omega_{carrier}$ is the rotation angular velocity of the carrier H, and $n_A$ is the number of times of rotation.

(ii) Torque Ratio

As is known from expression (17), although a torque ratio $M_{out}/M_{in}$ to be obtained is equal to $\omega_{zi1}/\omega_{carrier}$, it is difficult to directly obtain $\omega_{zi1}/\omega_{carrier}$. However, when the carrier H is set to a fixed element, the internal gear I2 is set to an input element, and the internal gear I1 is set to an output element, as in the third row of FIG. 5, the transmission efficiency $\eta 0$ is represented by the following expression (18). Further, $M_{out}$ is an output torque, $M_{in}$ is an input torque, $M_{carrier}$ is the torque of the carrier H, $M_{i1}$ is the torque of the internal gear I1, and $M_{i2}$ is the torque of the internal gear I2.

[Math. 24]

$$\eta_0 = \frac{M_{i1}}{M_{i2}} \cdot \left| \frac{\omega_{i1}}{\omega_{i2}} \right| \quad (18)$$

Here, the torques of the internal gear I1, the internal gear I2, and the carrier H have a relationship of the following expression (19) when $i_0 > 1$.

[Math. 25]

$$M_{carrier} + M_{i1} - M_{i2} = 0 \quad (19)$$

Here, since $i_0 = \omega_{i1}/\omega_{i2}$, the torque ratio $M_{out}/M_{in} = M_{i1}/M_{carrier}$ can be calculated by the following expression (20).

[Math. 26]

$$\frac{M_{i1}}{M_{carrier}} = \frac{\eta_0}{i_0 - \eta_0} \quad (20)$$

(iii) Overall Efficiency

The transmission efficiency $\eta$ of the compound planetary gear mechanism G can be obtained by the following expression (21) on the basis of the above expression (16), (17), and (20). In addition, $\eta_1$ and $\eta_2$ can be obtained by the above expression (12).

[Math. 27]

$$\eta = \frac{M_{out}}{M_{in}} \cdot \left|\frac{\omega_{out}}{\omega_{in}}\right| = \frac{\eta_0(i_0 - 1)}{i_0 - \eta_0} \qquad (21)$$

(2) Transmission Efficiency Improvement Method

The inventors found out that it is desirable to optimize addendum modification coefficients $x_{p1}$, $x_{p2}$, $x_{i1}$ and $x_{i2}$ of the four types of gears (the planetary gears P1 and P2 and the internal gears I1 and I2) constituting the compound planetary gear mechanism G as follows in order to improve the transmission efficiency $\eta$ of the above-described compound planetary gear mechanism G in FIGS. 1 and 2. Hereinafter, this will be described.

(2-1) Influence of Addendum Modification Coefficient

First, the influence of the addendum modification coefficients $x_{p1}$, $x_{p2}$, $x_{i1}$ and $x_{i2}$ on the transmission efficiency $\eta$ is considered. Relationships as represented by the following expression (22) are constantly established between the addendum modification coefficients $x_{p1}$, $x_{p2}$, $x_{i1}$ and $x_{i2}$.

[Math. 28]

$$x_{i1} - x_{p1} = x_{c1}$$

$$x_{i2} - x_{p2} = x_{in} + x_{c2} \qquad (22)$$

In expression (22), the coefficient $x_{in}$ is an addendum modification coefficient for matching inter-axis distances of the gear pair P1 and I1 and the gear pair P2 and I2, and coefficients $x_{c1}$ and $x_{c2}$ are addendum modification coefficients representing the influence of each gear pair which is caused by changing of the inter-axis distance between the gear pair P1 and I1 and the gear pair P2 and I2 by an addendum modification amount $X_c$ (inter-central axis distance coefficient). In response to variations in such addendum modification coefficients, the addendum circle diameters $d_{aik}$ and $d_{apk}$ and the standard circle diameters $d_{bik}$ and $d_{bpk}$ of the internal gear $I_k$ and the planetary gear $P_k$ shown in FIG. 4 vary. This can be represented by the following expression (23). Meanwhile, inv(a) is an involute function in the following expression.

[Math. 29]

$$d_{apk} = m_k z_{pk} + 2m_k(x_{pk} + x_{ck}) \qquad (23)$$
$$d_{ai1} = m_1 z_{i1} - 2m_1(1 - (x_{i1} + x_{c1}))$$
$$d_{ai2} = m_2 z_{i2} - 2m_2(1 - (x_{in} + x_{i2} + x_{c2}))$$
$$d_{bpk} = m_k z_{pk} \cos\alpha$$
$$x_{ck} = \frac{(z_{ik} - z_{pk})(inv(a_{wk}(r_{ck} + X_c)) - inv(a_{wk}(r_{ck})))}{2\tan a}$$
$$inv(a) = \tan a - a$$

(2-2) Optimization of Addendum Modification Coefficients

According to the above-described analysis, it is possible to obtain $d_{aik}$, $d_{apk}$, $d_{bik}$, and $d_{bpk}$ from expressions (23) and (22), obtain $a_{wk}$, $a_{zpk}$ and $a_{zik}$ from expression (15) using $d_{aik}$, $d_{apk}$, $d_{bik}$ and $d_{bpk}$, obtain $\varepsilon_{1k}$ and $\varepsilon_{2k}$ from expression (14) using $a_{wk}$, $a_{zpk}$ and $a_{zik}$, obtain $\varepsilon_{0k}$ from expression (13) using $\varepsilon_{1k}$ and $\varepsilon_{2k}$, obtain $\eta_k$ from expression (12) using $\varepsilon_{0k}$, and obtain the transmission efficiency $\eta$ from expression (21) using $\eta_k$. In this manner, when the compound planetary gear mechanism G is 3K type, it can be known that the transmission efficiency $\eta$ of the compound planetary gear mechanism G is a variable function (at least a generic function) using a combination of a set of the numbers of teeth ($z_{s1}$, $z_{p1}$, $z_{p2}$, $z_{i1}$, $z_{i2}$) and addendum modification coefficients ($x_{s1}$, $x_{p1}$, $x_{p2}$, $x_{i1}$, $x_{i2}$). Alternatively, when the compound planetary gear mechanism G is 2K-H type, it can be known that the transmission efficiency $\eta$ of the compound planetary gear mechanism G is a variable function (at least a generic function) using a combination of a set of the numbers of teeth ($z_{s1}$, $z_{p1}$, $z_{p2}$, $z_{i1}$, $z_{i2}$), a set of addendum modification coefficients ($x_{p1}$, $x_{p2}$, $x_{i1}$, $x_{i2}$) and the inter-central axis distance coefficient $X_c$. Accordingly, it is discovered that maximum efficiency of the compound planetary gear mechanism G can be obtained by solving an optimization problem of maximizing the transmission efficiency $\eta$ using the function of the following expression (24). Meanwhile, $z_{s1}$ is the number of teeth on the sun gear S1 and $x_{s1}$ is an addendum modification coefficient of the sun gear S1.

[Math. 30]

maximize $\eta(z_{s1}, z_{p1}, z_{p2}, z_{i1}, z_{i2}, x_{s1}, x_{p1}, x_{p2}, x_{i1}, x_{i2})$ subject to $-2 \leq x_{s1}, x_{p1}, x_{p2}, x_{i1}, x_{i2} \leq 2$ or maximize $\eta(z_{p1}, z_{p2}, z_{i1}, x_{i2}, x_{p1}, x_{p2}, x_{i1}, x_{i2}, X_c)$ subject to $-2 \leq x_{p1}, x_{p2}, x_{i1}, x_{i2} \leq 2$.

$$X_c = r_{c1}(x_{s1}, x_{p1}) = r_{c2}(x_{p1}, x_{i1}) = r_{c2}(x_{p2}, x_{i2}) \qquad (24)$$

In expression (24), $X_c$ is an addendum modification amount of the inter-axis distance between the gear pair P1 and I1 and the gear pair P2 and I2.

In addition, $X_c$ and coefficients $X_{c1}$ and $X_{c2}$ pertaining to the inter-axis distance have the relationship of the following expression (25) therebetween.

[Math. 31]

provided that $x_{ci} = x_{i1} - x_{p1}$ $X_c = r_{c1}(x_{s1}, x_{p1}) = r_{c1}'(x_{c1})$ provided that $x_{c1} = x_{s1} + x_{p1}$ $X_c = r_{c2}(x_{p2}, x_{i2}) = r_{c2}'(x_{c2})$ provided that $x_{c2} = x_{i2} - x_{p2}$ (25)

For example, an appropriate initial value is given to a vector $x = (x_{s1}, x_{p1}, x_{p2}, x_{i1}, x_{i2})$ or a vector $x = (x_{p1}, x_{p2}, x_{i1}, x_{i2})$ first. Then, a gradient vector $v = (\partial\eta/\partial x_{s1}, \partial\eta/\partial x_{p1}, \partial\eta/\partial x_{p2}, \partial\eta/\partial x_{i1}, \partial\eta/\partial x_{i2})$ or a gradient vector $v = (\partial\eta/\partial x_{p1}, \partial\eta/\partial x_{p2}, \partial\eta/\partial x_{i1}, \partial\eta/\partial x_{i2}, \partial\eta/\partial X_c)$ are calculated, a vector q which satisfies $v \cdot q > 0$ is selected, and x is updated to $x := x + \gamma q$. However, $\gamma$ is a positive real number and is adjusted to satisfy the inequality $v \cdot q > 0$ described above. A step of recalculating the gradient vector v at the point of an updated value of x, selecting q adapted therefor, and updating x is repeated until an update amount $\gamma q$ of x sufficiently decreases. As described above, a combination of a set of the numbers of teeth ($z_{s1}$, $z_{p1}$, $z_{p2}$, $z_{i1}$, $z_{i2}$) and addendum modification coefficients ($x_{s1}$, $x_{p1}$, $x_{p2}$, $x_{i1}$, $x_{i2}$) or a combination of a set of the numbers of teeth ($z_{p1}$, $z_{p2}$, $z_{i1}$, $z_{i2}$), a set of addendum modification coefficients ($x_{p1}$, $x_{p2}$, $x_{i1}$, $x_{i2}$), and the inter-central axis distance coefficient $X_c$ which maximizes the transmission efficiency η can be obtained, and this is desirably used as a configuration (design values) of the compound planetary gear mechanism G. Meanwhile, a design procedure will be described later.

Figure 6:
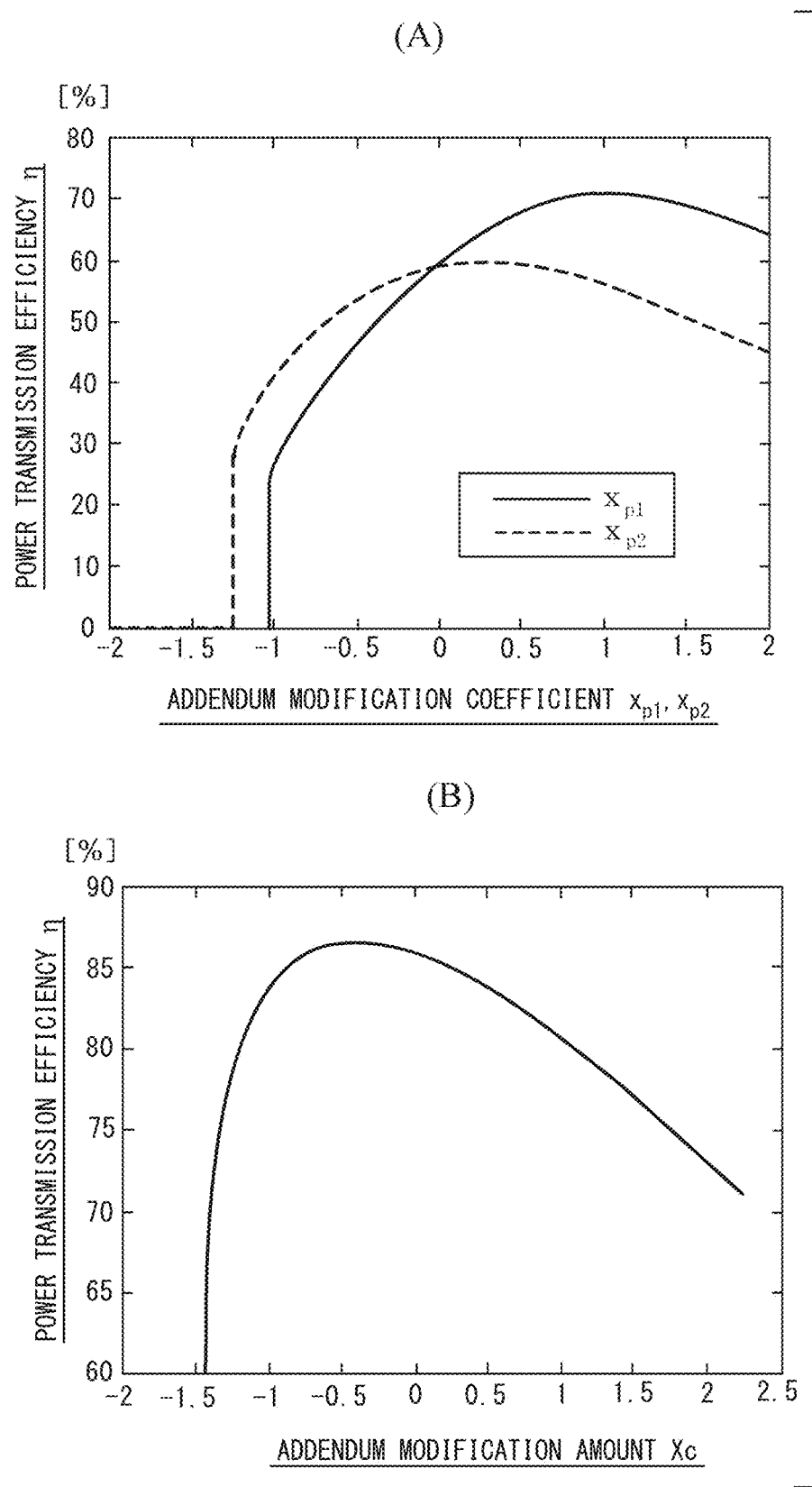
FIG. 6(A) is a graph showing a relationship between an addendum modification coefficient and power transmission efficiency and FIG. 6(B) is a graph showing a relationship between an addendum modification amount of an inter-axis distance between gear pairs and power transmission efficiency.

FIG. 6(A) is a graph showing changes in the transmission efficiency η associated with changes in addendum modification coefficients $x_{p1}$ and $x_{p2}$. FIG. 6(B) is a graph showing variation in the transmission efficiency η in association with variation (adjustment) in the addendum modification amount $X_c$ of the inter-axis distance between the gear pair P1 and I1 and the gear pair P2 and I2. FIG. 6(A) shows variation in the transmission efficiency η in association with variation in the addendum modification coefficient $x_{p1}$ and variation in the transmission efficiency η in association with variation in the addendum modification coefficient $x_{p2}$. The value of the addendum modification coefficient $x_{p2}$ is fixed to 0 in the former condition (addendum modification coefficient $x_{p1}$ is variable) and the value of the addendum modification coefficient $x_{p1}$ is fixed to 0 in the latter condition (addendum modification coefficient $x_{p2}$ is variable), and thus the addendum modification coefficients $x_{p1}$ and $x_{p2}$ are factors which independently contribute to improvement of the transmission efficiency η and they have optimum values which maximize the transmission efficiency η. In addition, FIG. 6(B) shows variation in the transmission efficiency η in association with variation in the addendum modification amount $X_c$. The addendum modification amount $X_c$ also has an optimum value which maximizes the transmission efficiency η. Meanwhile, as can be known from the aforementioned expressions (22) and (23), the addendum modification amount $X_c$ has a correlation with the addendum modification coefficients $x_{i1}$ and $x_{i2}$ of the internal gears I1 and I2, and thus the addendum modification coefficients $x_{i1}$ and $x_{i2}$ also have optimum values which maximize the transmission efficiency η.

(2-3) Transmission Efficiency Improvement Result According to Optimization

Next, an example of changing the addendum modification coefficients $x_{p1}$, $x_{p2}$, $x_{i1}$ and $x_{i2}$ as variable factors to obtain numerical values of the addendum modification coefficients $x_{p1}$, $x_{p2}$, $x_{i1}$ and $x_{i2}$ which maximize the transmission efficiency η and optimizing or maximizing the addendum modification coefficient $x_{p1}$, $x_{p2}$, $x_{i1}$ and $x_{i2}$, and the transmission efficiency η will be described.

Embodiment 1

FIG. 7 is a table showing a result obtained by optimizing the addendum modification coefficients $x_{p1}$, $x_{p2}$, $x_{i1}$ and $x_{i2}$ to maximize the transmission efficiency η with respect to the compound planetary gear mechanism G In calculation of the transmission efficiency η, settings of module $m_2$ of the second planetary gear mechanism (the planetary gear P1 and the internal gear I2) are changed to a diametral pitch (DP) and modules are set to $m_1$=1 and $m_2$=25.4/24=1.0583 (DP24) in setting of modules $m_1$=$m_2$=1. Further, the coefficient of friction μ is set to μ=0.02.

"Before optimization" shown in FIG. 7 means that minimal dislocation for matching inter-axis distances has been applied only to the internal gear I2 ($x_{i2}$=$x_{i1}$) and dislocation which intends improvement of the transmission efficiency η has not been performed (accordingly, $x_{p1}$=$x_{p2}$=$x_{i1}$=0). On the other hand, "after optimization" shown in FIG. 7 means that the values of the addendum modification coefficients $x_{p1}$, $x_{p2}$, $x_{i1}$ and $x_{i2}$ have been optimized to maximize the transmission efficiency η. The optimized values of the addendum modification coefficients $x_{p1}$, $x_{p2}$, $x_{i1}$ and $x_{i2}$ are shown in the column labeled "addendum modification coefficient" in FIG. 7. Further, values of the transmission efficiency η of "before optimization" and "after optimization" are described in the column labeled "power transmission efficiency" in FIG. 7. As shown in FIG. 7, the power transmission efficiency is optimized from 92.0583 before optimization to 95.91156 after optimization when a target reduction gear ratio is 50, for example, and optimized from 70.7996 before optimization to 85.09962 after optimization when the target reduction gear ratio is 200.

Embodiment 2

Figure 8:
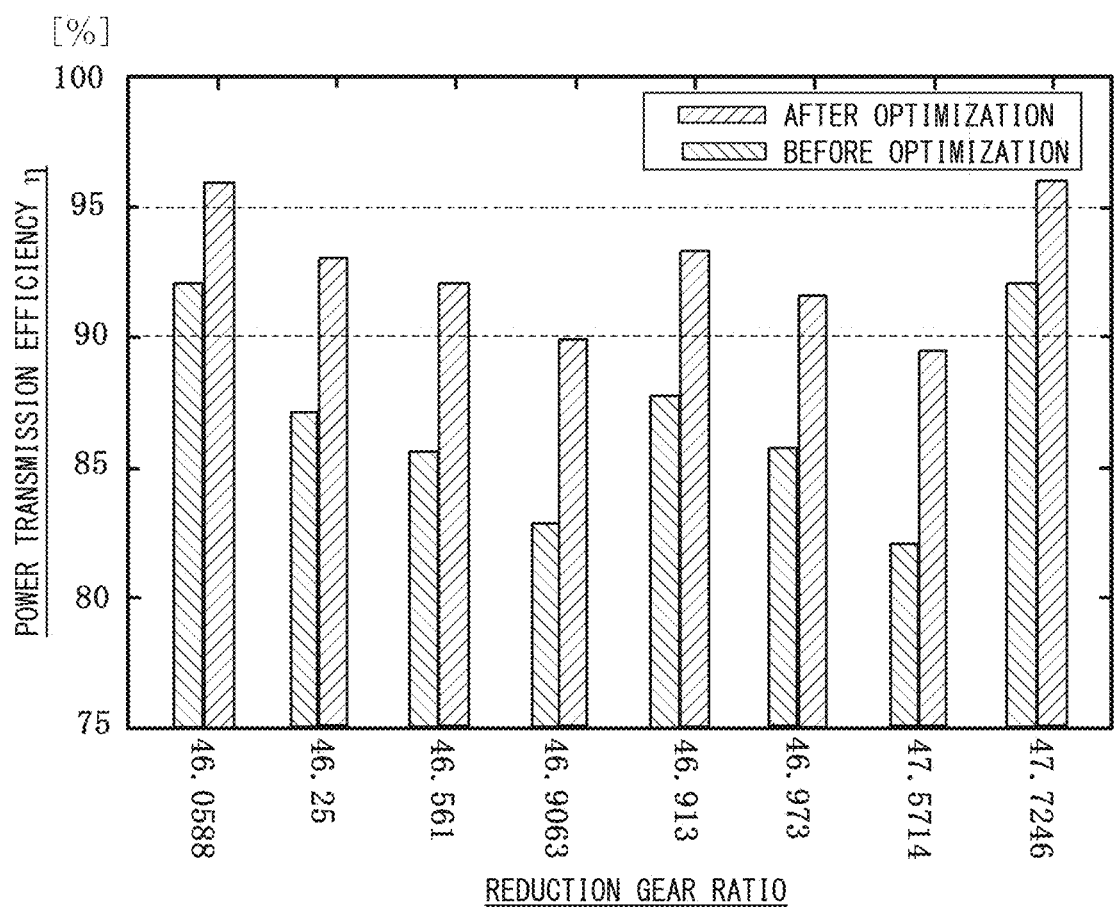
FIG. 8 is a graph showing a difference between power transmission efficiency before optimization and power transmission efficiency after optimization with respect to a compound planetary gear mechanism having a reduction gear ratio of about 50.
Figure 9:
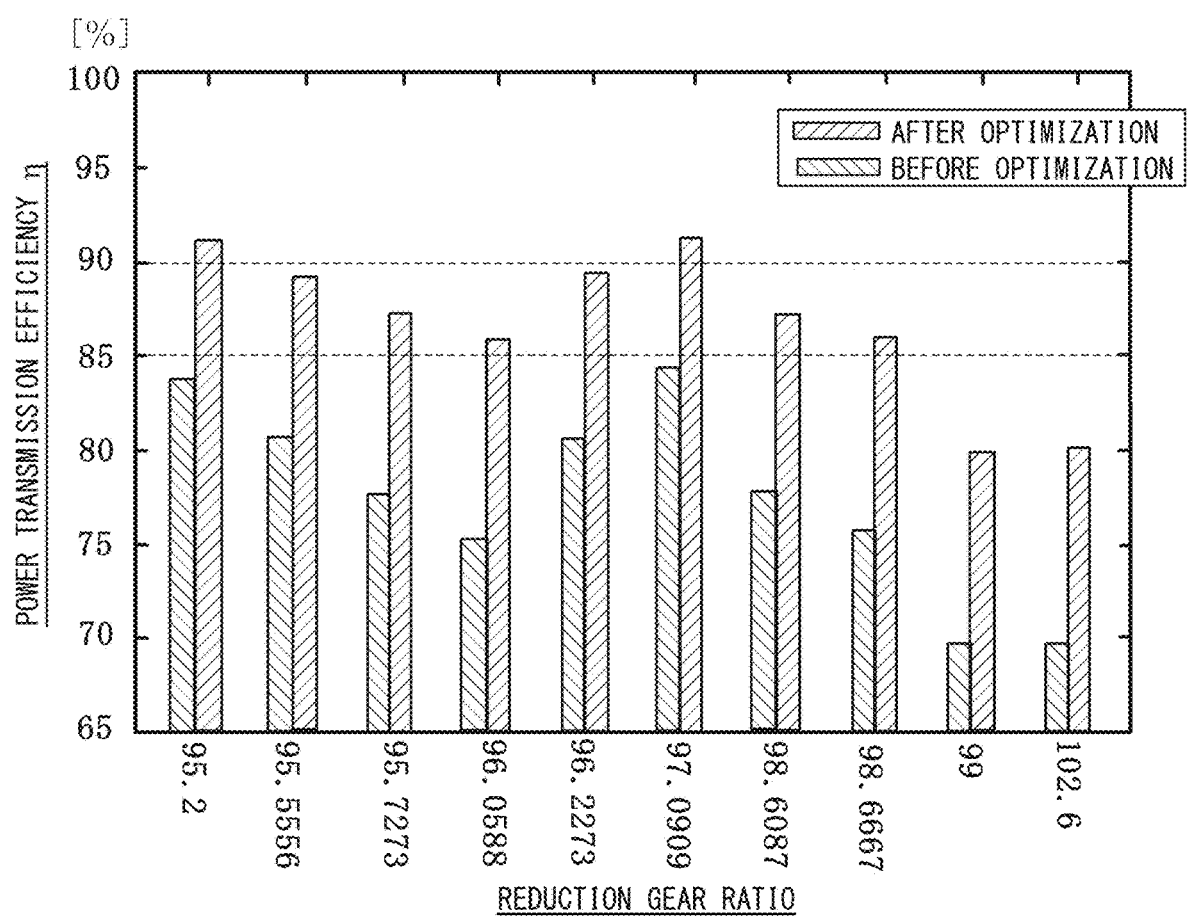
FIG. 9 is a graph showing a difference between power transmission efficiency before optimization and power transmission efficiency after optimization with respect to a compound planetary gear mechanism having a reduction gear ratio of about 100.
Figure 10:
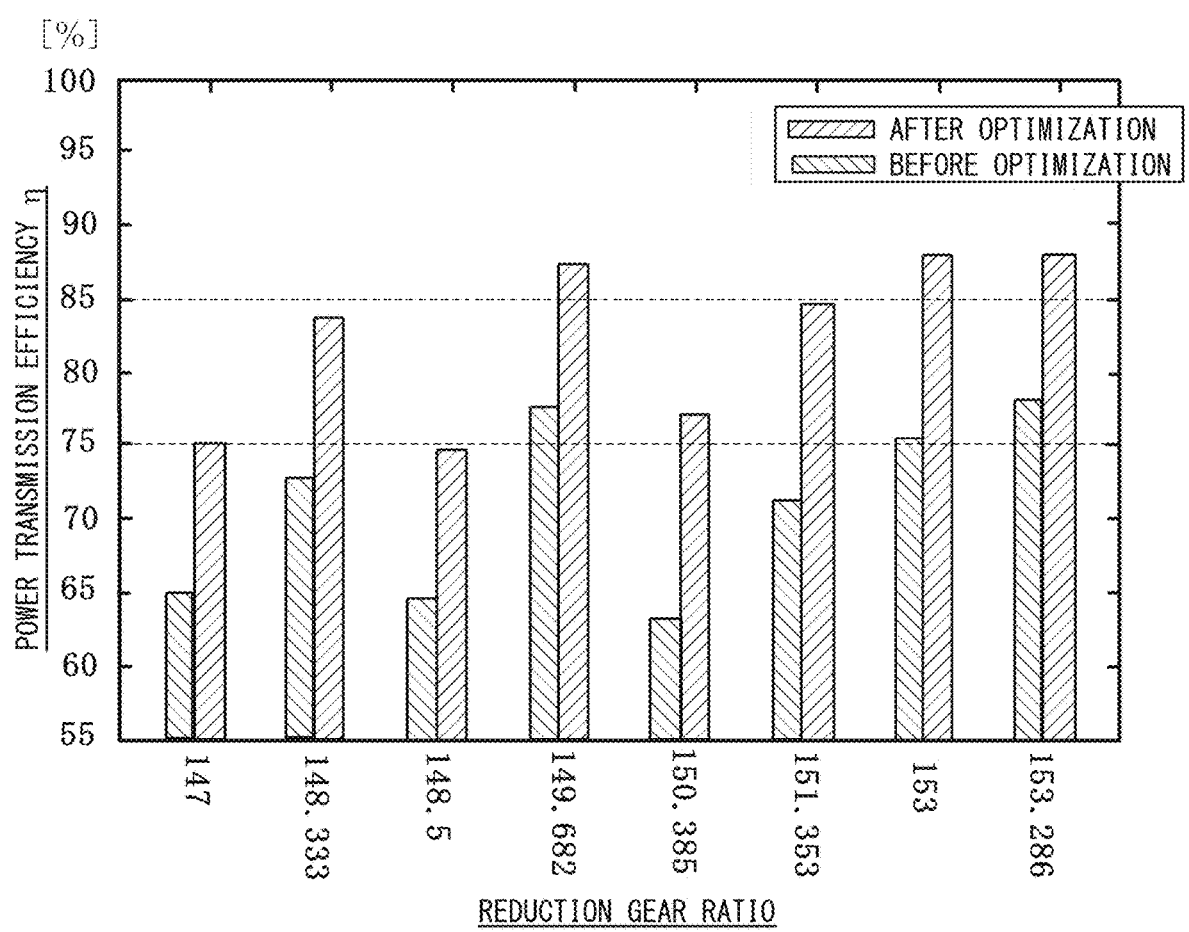
FIG. 10 is a graph showing a difference between power transmission efficiency before optimization and power transmission efficiency after optimization with respect to a compound planetary gear mechanism having a reduction gear ratio of about 150.
Figure 11:
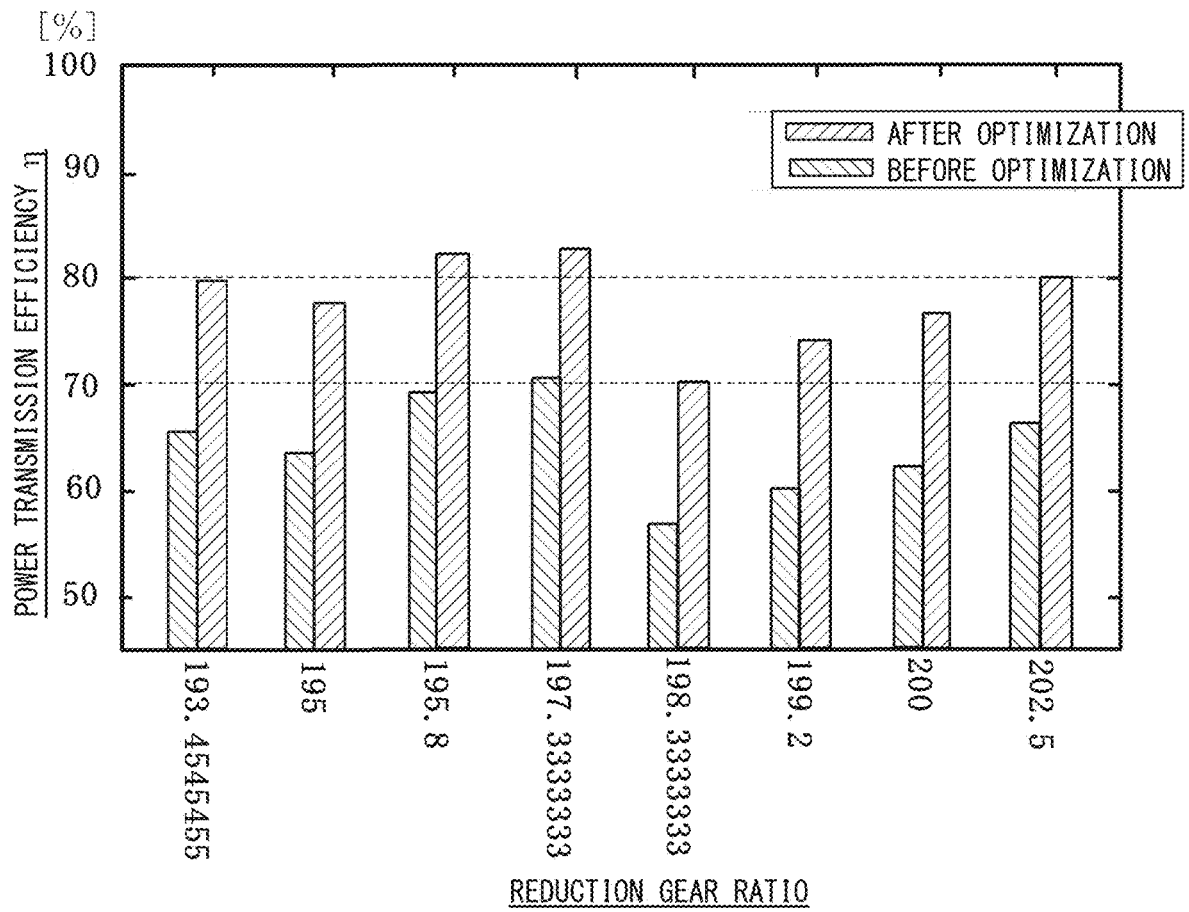
FIG. 11 is a graph showing a difference between power transmission efficiency before optimization and power transmission efficiency after optimization with respect to a compound planetary gear mechanism having a reduction gear ratio of about 200.

FIGS. 8 to 11 show a plurality of design examples in which targeted reduction gear ratios are set to 50, 100, 150 and 200 and a combination of factors affecting the transmission efficiency η is differentiated in each band near the four target reduction gear ratios. FIG. 8 is a graph showing a difference between power transmission efficiency before optimization and power transmission efficiency after optimization with respect to a compound planetary gear mechanism having a reduction gear ratio of about 50. FIG. 9 is a graph showing a difference between power transmission efficiency before optimization and power transmission efficiency after optimization with respect to a compound planetary gear mechanism having a reduction gear ratio of about 100. FIG. 10 is a graph showing a difference between power transmission efficiency before optimization and power transmission efficiency after optimization with respect to a compound planetary gear mechanism having a reduction gear ratio of about 150. FIG. 11 is a graph showing a difference between power transmission efficiency before optimization and power transmission efficiency after optimization with respect to a compound planetary gear mechanism having a reduction gear ratio of about 200. Meanwhile, the design example shown in the graph of FIG. 7 pertains to two examples selected for each band in which a relatively higher transmission efficiency η than those in the plurality of design examples shown in FIGS. 8 to 11 is acquired.

As shown in FIGS. 8 to 11, the transmission efficiency η has been definitely improved and efficiency improvement effect of about 5 to 20% was obtained by attempting optimization according to the present invention. Specifically, in a band near the target reduction gear ratio of 50, the transmission efficiency η exceeds about 90% and exceeds 95% in some design examples, as shown in FIG. 8. In a band near the target reduction gear ratio of 100, the transmission efficiency η exceeds about 85% and exceeds 90% in some design examples, as shown in FIG. 9. In addition, in a band near the target reduction gear ratio of 150, the transmission efficiency η exceeds about 75% and exceeds 85% in some design examples, as shown in FIG. 10. In a band near the target reduction gear ratio of 200, the transmission efficiency η exceeds about 70% and exceeds 80% in some design examples, as shown in FIG. 11.

Although the optimization method according to the present invention has been described above using a case in which the internal gear I2 is fixed, the carrier H is set to input means, the internal gear I1 is set to output means, and $i_0$=($z_{i2}$/$z_{p2}$)·($z_{p1}$/$z_{i1}$)>1 as an example, when $i_0$<1, expression (21) is replaced by the following expression (26).

[Math. 32]

$$\eta = \frac{M_{out}}{M_{in}} \cdot \left|\frac{\omega_{out}}{\omega_{in}}\right| = \frac{\eta_0(i_0+1)}{\eta_0 - i_0} \quad (26)$$

It is desirable to perform a process of obtaining a maximum efficiency of the compound planetary gear mechanism G by solving the optimization problem of maximizing the transmission efficiency η according to the function of the aforementioned expression (24).

In addition, when the internal gear I1 is fixed, the carrier H is set to input means, the internal gear I2 is set to output means, and $i_0 > 1$, it is desirable to replace expression (21) with the following expression (27) using g as a reduction gear ratio and η as a transmission efficiency.

[Math. 33]

$$g = 1 - \frac{1}{i_0}, \eta = \frac{i_0 - 1}{i_0 - \eta_0} \quad (27)$$

In addition, when the internal gear I1 is fixed, the carrier H is set to output means, the internal gear I2 is set to input means, and $i_0 > 1$, it is desirable to replace expression (21) with the following expression (28) using g as a reduction gear ratio and η as a transmission efficiency.

[Math. 34]

$$g = \frac{i_0}{i_0 - 1}, \eta = \frac{\eta_0 i_0 - 1}{\eta_0(i_0 - 1)} \quad (28)$$

In addition, when the internal gear I1 is fixed, the carrier H is set to input means, the internal gear I2 is set to output means, and $i_0 < 1$, it is desirable to replace expression (21) with the following expression (29) using g as a reduction gear ratio and η as a transmission efficiency.

[Math. 35]

$$g = 1 - \frac{1}{i_0}, \eta = \frac{\eta_0(1 - i_0)}{1 - \eta_0 i_0} \quad (29)$$

In addition, when the internal gear I1 is fixed, the carrier H is set to output means, the internal gear I2 is set to input means, and $i_0 < 1$, it is desirable to replace expression (21) with the following expression (30) using g as a reduction gear ratio and η as a transmission efficiency.

[Math. 36]

$$g = \frac{i_0}{i_0 - 1}, \eta = \frac{\eta_0 - i_0}{1 - i_0} \quad (30)$$

Figure 12:
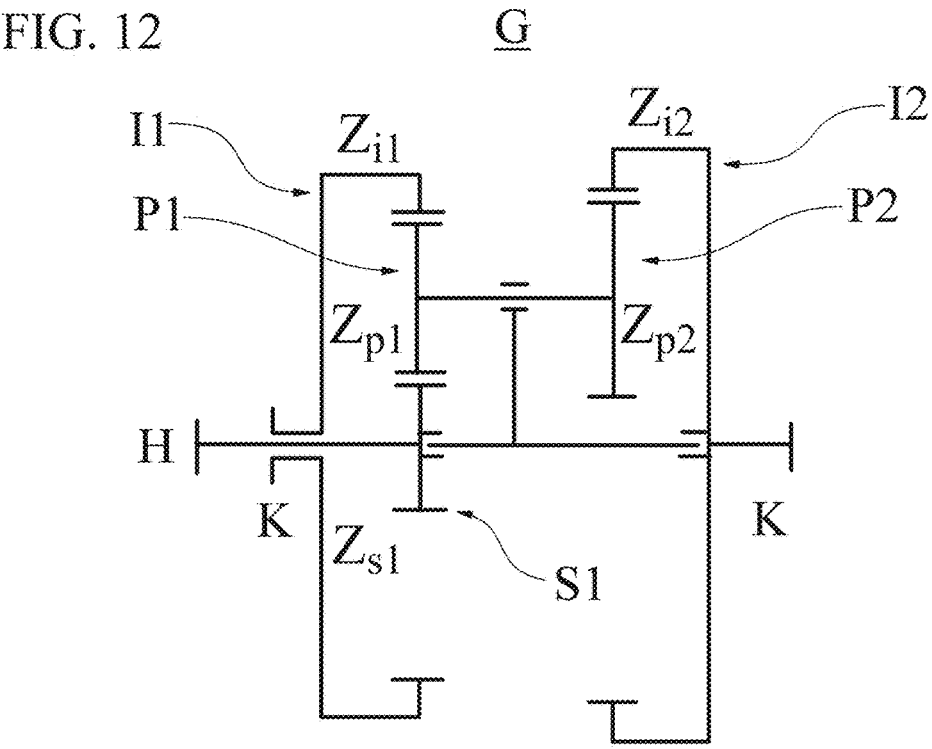
FIG. 12 is a schematic diagram showing another configuration of the compound planetary gear mechanism according to the present embodiment.
Figure 13:
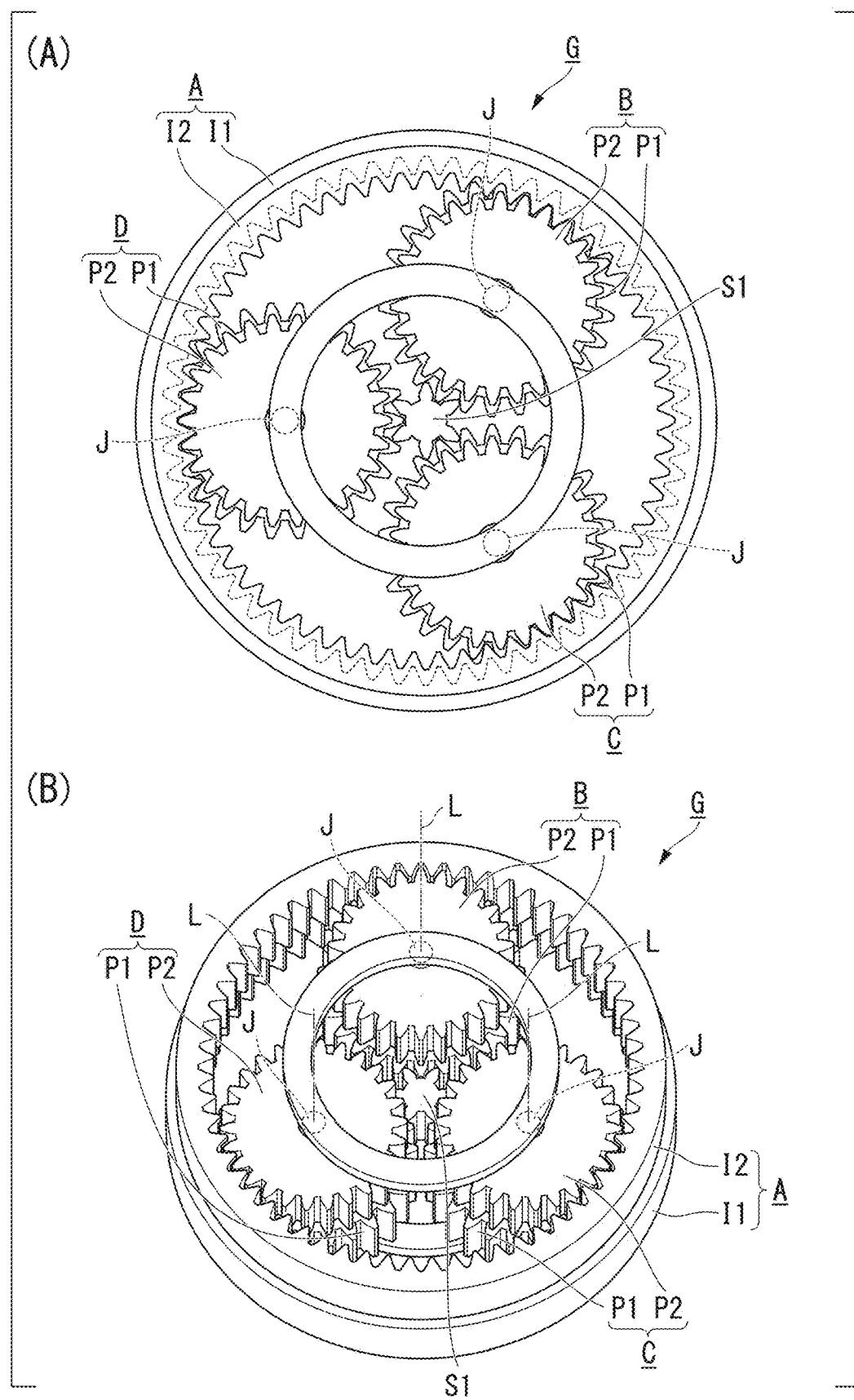
FIG. 13 is a front view and a perspective view schematically showing another structure of the compound planetary gear mechanism shown in FIG. 12.

Although the optimization method of the present invention has been described above by exemplifying a 2K-H type compound planetary gear mechanism as shown in FIGS. 1 and 2, the present invention is also applicable to a compound planetary gear mechanism generally called 3K type as shown in FIG. 12. FIG. 12 is a schematic diagram showing another configuration of the compound planetary gear mechanism according to the present embodiment. FIG. 13 is a front view and a perspective view schematically showing another structure of the compound planetary gear mechanism shown in FIG. 12. Further, FIG. 13(A) is a front view schematically showing another structure of the compound planetary gear mechanism shown in FIG. 12 and FIG. 13(B) is a perspective view schematically showing another structure of the compound planetary gear mechanism shown in FIG. 12.

Meanwhile, in FIG. 12 and FIG. 13, signs I1 and I2 denote internal gears, sign S1 denotes a sun gear, signs P1 and P2 denote planetary gears, sign J denotes a spindle, and sign H denotes a carrier.

As shown in FIG. 13 an internal tooth gear A includes the internal gears I1 and I2. A first planetary gear mechanism B includes a planetary gear P1 (first planetary gear) and a planetary gear P2 (first planetary gear). A second planetary gear mechanism C includes a planetary gear P1 (first planetary gear) and a planetary gear P2 (first planetary gear). A third planetary gear mechanism D includes a planetary gear P1 (first planetary gear) and a planetary gear P2 (first planetary gear). The carrier H supports a plurality of spindles J arranged at intervals in the circumferential direction. Each spindle J coaxially and rotatably bears the planetary gears P1 and P2 of the first planetary gear mechanism B, the second planetary gear mechanism C and the third planetary gear mechanism D by a spindle bearing (not shown). The planetary gears P1 and P2 of each of the first planetary gear mechanism B, the second planetary gear mechanism C, and the third planetary gear mechanism D are engaged with internal gears I1 and I2 composed of spur gears. In addition, to constitute the entire planetary gear device as a two-stage gear mechanism, the planetary gears P1 and P2 share a central axis such that they integrally rotate on a common rotation central axis line L or central axes thereof are integrally connected, or they are integrated with each other such that they integrally rotate on the common rotation central axis line L.

When the internal gear I2 is fixed, the sun gear S1 is set to input means, the internal gear I2 is set to output means, $i_0 = z_{i1}/z_{s1} > 1$, and $i_1 = (z_{i2}/z_{p2}) \cdot (z_{p1}/z_{i1}) > 1$ in the compound planetary gear mechanism generally called 3K type, if expression (21) is replaced by the following expression (31) using g as a reduction gear ratio and η as a transmission efficiency,

[Math. 37]

$$g = \frac{1}{1 + i_0}\left(1 - \frac{1}{i_1}\right), \eta = \left(\frac{1 + \eta_0 i_0}{1 + i_0}\right)\left(\frac{i_1 - 1}{i_1 - \eta_1}\right). \quad (31)$$

The transmission efficiency can be optimized in the same manner.

When the internal gear I1 is fixed, the sun gear S1 is set to output means, the internal gear I2 is set to input means, $i_0 = z_{i1}/z_{s1} > 1$, and $i_1 = (z_{i2}/z_{p2}) \cdot (z_{p1}/z_{i1}) > 1$ in the compound planetary gear mechanism generally called 3K type, if expression (21) is replaced by the following expression (32) using g as a reduction gear ratio and η as a transmission efficiency,

[Math. 38]

$$g = (1 + i_0)\frac{i_1}{i_1 - 1}, \eta = \left(\frac{\eta_0(1 + i_0)}{\eta_0 + i_0}\right)\left(\frac{\eta_1 i_1 - 1}{\eta_1(i_1 - 1)}\right). \quad (32)$$

The transmission efficiency can be optimized in the same manner.

When the internal gear I1 is fixed, the sun gear S1 is set to input means, the internal gear I2 is set to output means, $i_0 = z_{i1}/z_{s1} < 1$, and $i_1 = (z_{i2}/z_{p2}) \cdot (z_{p1}/z_{i1}) < 1$ in the compound planetary gear mechanism generally called 3K type, if expression (21) is replaced by the following expression (33) using g as a reduction gear ratio and η as a transmission efficiency,

[Math. 39]

$$g = \frac{1}{1 + i_0}\left(1 - \frac{1}{i_1}\right), \eta = \left(\frac{1 + \eta_0 i_0}{1 + i_0}\right)\frac{\eta_1(1 - i_1)}{1 - \eta_1 i_1}. \quad (33)$$

The transmission efficiency can be optimized in the same manner.

When the internal gear I1 is fixed, the sun gear S1 is set to output means, the internal gear I2 is set to input means, $i_0 = z_{i1}/z_{s1} < 1$, and $i_1 = (z_{i2}/z_{p2}) \cdot (z_{p1}/z_{i1}) < 1$ in the compound planetary gear mechanism generally called 3K type, if expression (21) is replaced by the following expression (34) using g as a reduction gear ratio and η as a transmission efficiency,

[Math. 40]

$$g = (1 + i_0)\frac{1}{i_1 - 1}, \eta = \left(\frac{\eta_0(1 + i_0)}{\eta_0 + i_0}\right)\left(\frac{\eta_1 - i_1}{1 - i_1}\right). \quad (34)$$

The transmission efficiency can be optimized in the same manner.

Next, an example of a method of designing the compound planetary gear mechanism G such that power transmission efficiency is maximized will be described.

Figure 14:
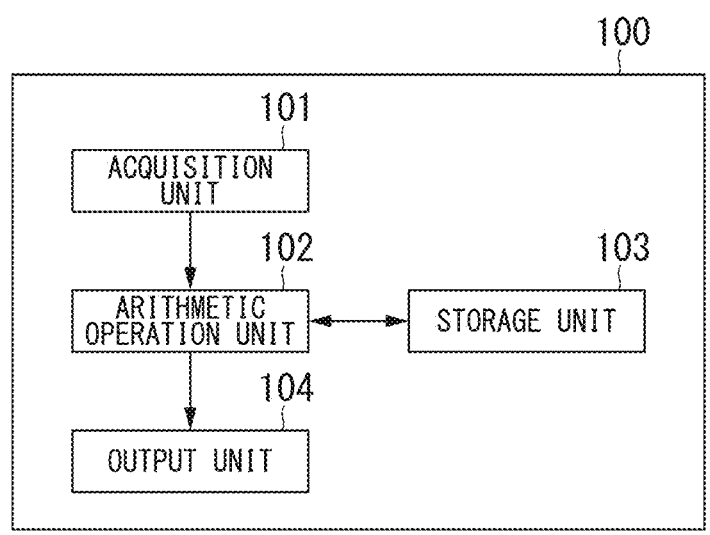
FIG. 14 is a configuration example of a device for designing a compound planetary gear mechanism G.

FIG. 14 shows an example of a configuration of a design apparatus 100 for designing the compound planetary gear mechanism G As shown in FIG. 14, the design apparatus 100 includes an acquisition unit 101, an arithmetic operation unit 102, a storage unit 103, and an output unit 104. The design apparatus 100 is a personal computer, for example.

The acquisition unit 101 acquires set values of the compound planetary gear mechanism G and outputs the acquired set values to the arithmetic operation unit 102. A keyboard, a mouse, a touch panel sensor, and the like may be connected to the acquisition unit 101 and the acquisition unit 101 may be a universal serial bus (USB) terminal, a communication unit, or the like.

The arithmetic operation unit 102 puts the set values output by the acquisition unit 101 into expressions stored in the storage unit 103 to calculate addendum modification coefficients which maximize the power transmission efficiency and the like. The arithmetic operation unit 102 outputs the calculated addendum modification coefficient and the like to the output unit 104. The arithmetic operation unit 102 is a CPU (central processing unit), for example.

The storage unit 103 stores the aforementioned expressions, initial values, a design program for the compound planetary gear mechanism G, and the like. The storage unit 103 is a random access memory (RAM), a read only memory (ROM), a hard disk drive (HDD), or a solid state drive (SSD).

The output unit 104 outputs the addendum modification coefficient and the like output by the arithmetic operation unit 102. The output unit 104 is a display device, a printing device, a communication device, or the like, for example.

Here, set values are described.

Examples of set values are as follows.

I. The compound planetary gear mechanism G is 2K-H type/3K type.

II. The internal gear I2 is fixed, the carrier H is input means, and the internal gear I1 is output means.

III. The internal gear I1 is fixed, the carrier H is input means, and the internal gear I2 is output means.

IV. The internal gear I1 is fixed, the carrier H is output means, and the internal gear I2 is input means.

V. The internal gear I1 is fixed, the carrier H is input means, and the internal gear I2 is output means.

VI. The internal gear I1 is fixed, the carrier H is output means, and the internal gear I2 is input means.

Meanwhile, the set values of H to VI are for a case of 2K-H type and correspond to any one of the five.

VII. The internal gear I1 is fixed, the sun gear S1 is input means, and the internal gear I2 is output means.

VIII. The internal gear I1 is fixed, the sun gear S1 is output means, and the internal gear I2 is input means.

IX. The internal gear I1 is fixed, the sun gear S1 is input means, and the internal gear I2 is output means.

X. The internal gear I1 is fixed, the sun gear S1 is output means, and the internal gear I2 is input means.

Meanwhile, the set values of VII to X are for a case of 3K type and correspond to any one of the five.

XI. The number of teeth $z_{i1}$ of the internal gear I1, the number of teeth $z_{i2}$ of the internal gear I2, the number of teeth $z_{p1}$ of the planetary gear P1, the number of teeth $z_{p2}$ of the planetary gear P2, module $m_1$ of the internal gear I1 and the planetary gear P1, module $m_2$ of the internal gear I2 and the planetary gear P2, and the number of planetary gears P1 and P2.

Next, an example of a design method will be described. First, a method of designing the compound planetary gear mechanism G in a configuration having the sun gear S1 will be described.

Figure 15:
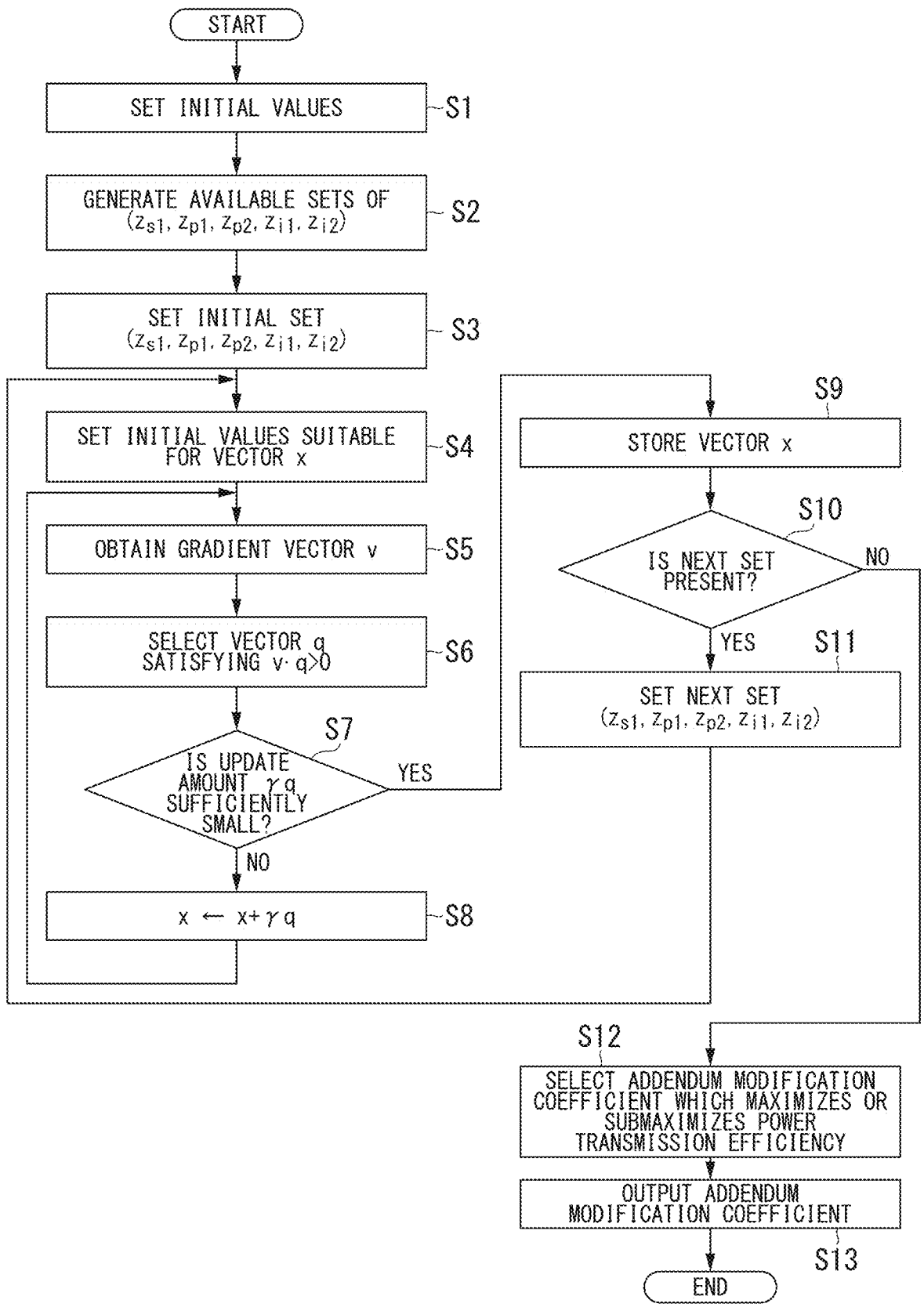
FIG. 15 is a flowchart showing an example of a design procedure of a compound planetary gear mechanism G having a configuration including a sun gear.

FIG. 15 is a flowchart showing an example of a design procedure for the compound planetary gear mechanism G having a configuration in which the sun gear S1 is included.

(Step S1) A user inputs or selects set values of the compound planetary gear mechanism G. The acquisition unit 101 acquires the set values and outputs the acquired set values to the arithmetic operation unit 102.

(Step S2) The arithmetic operation unit 102 generates a set of numbers of teeth $(z_{s1}, z_{p1}, z_{p2}, z_{i1}, z_{i2})$ which can be combined.

(Step S3) The arithmetic operation unit 102 sets a set of initial numbers of teeth $(z_{s1}, z_{p1}, z_{p2}, z_{i1}, z_{i2})$ which can be combined.

(Step S4) The arithmetic operation unit 102 assigns suitable initial values to a vector $x = (x_{s1}, x_{p1}, x_{p2}, x_{i1}, x_{i2})$ (addendum modification coefficient). Further, the suitable initial values are stored in the storage unit 103.

(Step S5) The arithmetic operation unit 102 obtains a gradient vector $v = (\partial \eta/\partial x_{s1}, \partial \eta/\partial x_{p1}, \partial \eta/\partial x_{p2}, \partial \eta/\partial x_{i1}, \partial \eta/\partial x_{i2})$.

(Step S6) The arithmetic operation unit 102 selects a vector q which satisfies $v \cdot q > 0$.

(Step S7) The arithmetic operation unit 102 determines whether an update amount γq of x has sufficiently decreased. The arithmetic operation unit 102 proceeds to step S8 when the arithmetic operation unit 102 determines that the update amount γq has not sufficiently decreased (step S7; NO) and proceeds to step S9 when the arithmetic operation unit 102 determines that the update amount γq has sufficiently decreased (step S7; YES). Meanwhile, it is desirable that a sufficiently small case be sufficiently small with respect to an amount determined from gear processing accuracy, for example.

(Step S8) The arithmetic operation unit 102 adds γq to the vector x to update the vector x. After the update, the arithmetic operation unit 102 returns to the process of step S5.

(Step S9) The arithmetic operation unit 102 stores the vector x corresponding to the set of the numbers of teeth $(z_{s1}, z_{p1}, z_{p2}, z_{i1}, z_{i2})$ in the storage unit 103. After the process, the arithmetic operation unit 102 proceeds the process to step S10.

(Step S10) The arithmetic operation unit 102 determines whether the next combination of the numbers of teeth $(z_{s1}, z_{p1}, z_{p2}, z_{i1}, z_{i2})$ which can be combined is present. When the arithmetic operation unit 102 determines that the next combination of the numbers of teeth $(z_{s1}, z_{p1}, z_{p2}, z_{i1}, z_{i2})$ which can be combined is present (step S10; YES), the arithmetic operation unit 102 proceeds to the process of step S11. When the arithmetic operation unit 102 determines that the next combination of the numbers of teeth $(z_{s1}, z_{p1}, z_{p2}, z_{i1}, z_{i2})$ which can be combined is not present (step S10; NO), the arithmetic operation unit 102 proceeds to the process of step S12.

(Step S11) The arithmetic operation unit 102 sets the next set of $(z_{s1}, z_{p1}, z_{p2}, z_{i1}, z_{i2})$ which can be combined. After the process, the arithmetic operation unit 102 returns the process to step S4.

(Step S12) The arithmetic operation unit 102 selects a combination of the numbers of teeth $(z_{s1}, z_{p1}, z_{p2}, z_{i1}, z_{i2})$ and addendum modification coefficients $(x_{s1}, x_{p1}, x_{p2}, x_{i1}, x_{i2})$ which maximizes or submaximizes the power transmission efficiency ti from combinations of the vector $x=(x_{s1}, x_{p1}, x_{p2}, x_{i1}, x_{i2})$ which is a combination of the numbers of teeth $(z_{s1}, z_{p1}, z_{p2}, z_{i1}, z_{i2})$ and addendum modification coefficients. Meanwhile, submaximum is a maximal value or an allowable range including a maximum value or a maximal value (e.g., 90% or more).

(Step S13) The arithmetic operation unit 102 outputs the combination of the numbers of teeth $(z_{s1}, z_{p1}, z_{p2}, z_{i1}, z_{i2})$ and addendum modification coefficients $(x_{s1}, x_{p1}, x_{p2}, x_{i1}, x_{i2})$ which maximizes the power transmission efficiency η as a most suitable design value.

Meanwhile, the arithmetic operation unit 102 may further calculate a torque and the like using calculated addendum modification coefficients.

Next, a method of designing a compound planetary gear mechanism G having a configuration in which the sun gear S1 is not included will be described.

Figure 16:
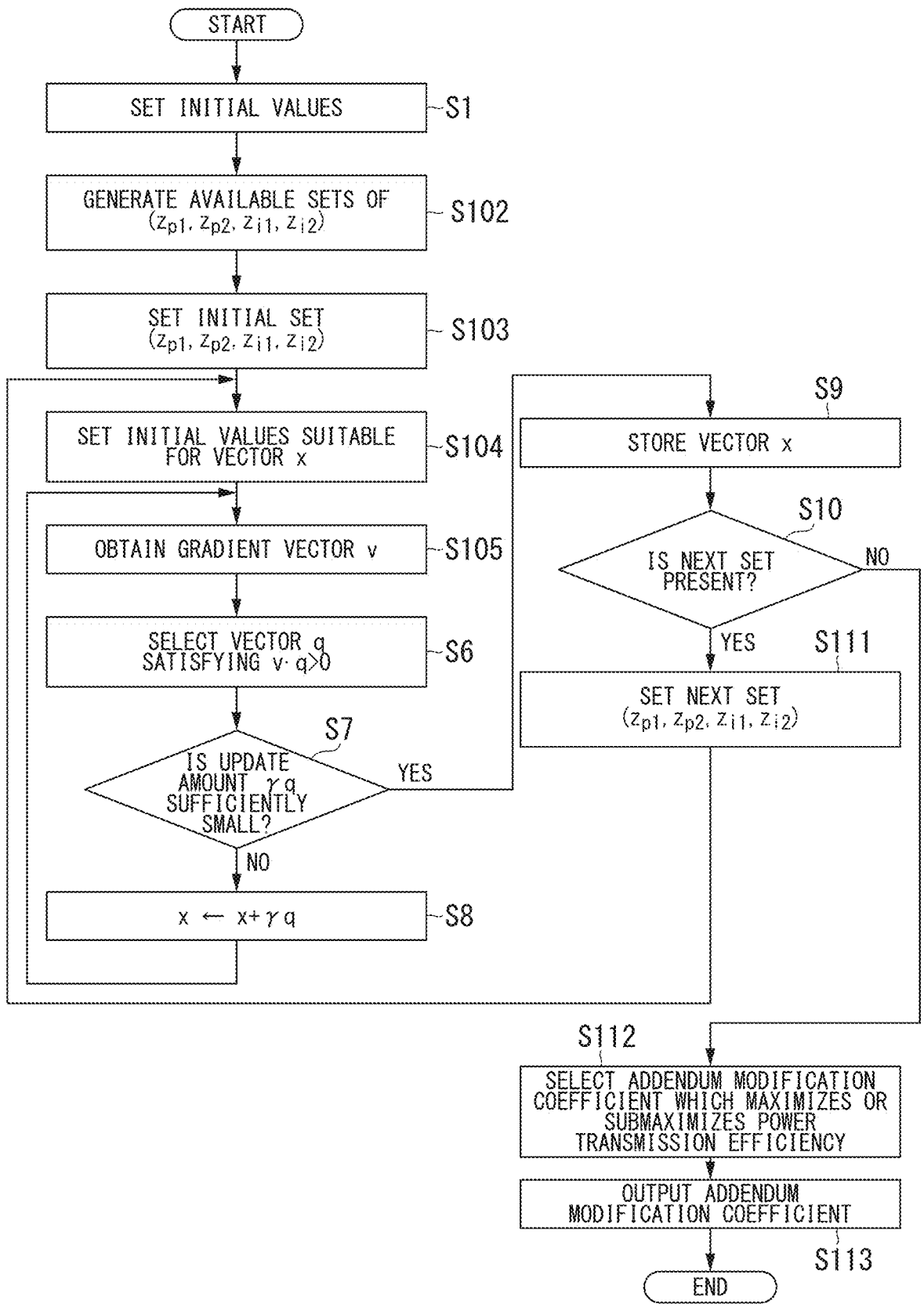
FIG. 16 is a flowchart showing an example of a design procedure of a compound planetary gear mechanism G having a configuration including no sun gear.
Figure 17:
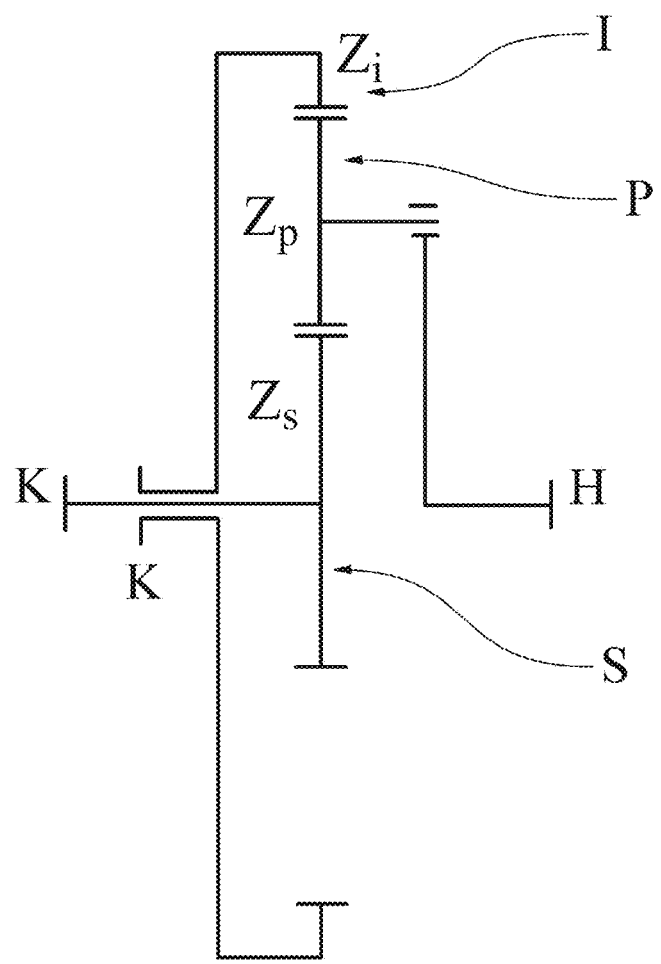
FIG. 17 is a schematic diagram showing a conventional configuration pertaining to a planetary gear mechanism including a sun gear, a planetary gear, an internal gear, and a carrier.
Figure 18:
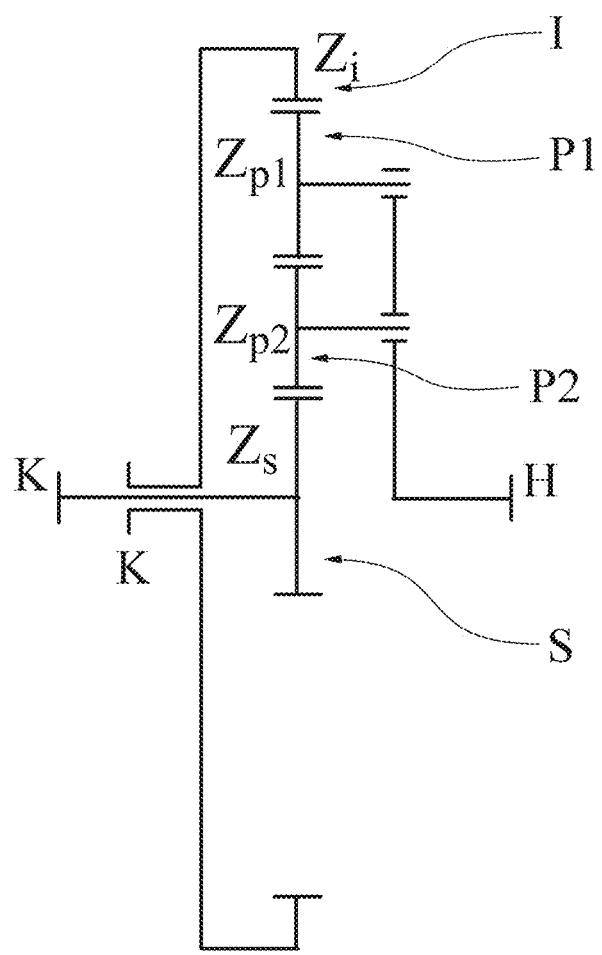
FIG. 18 is a schematic diagram showing another conventional configuration pertaining to a planetary gear mechanism including a sun gear, a planetary gear, an internal gear, and a carrier.
Figure 19:
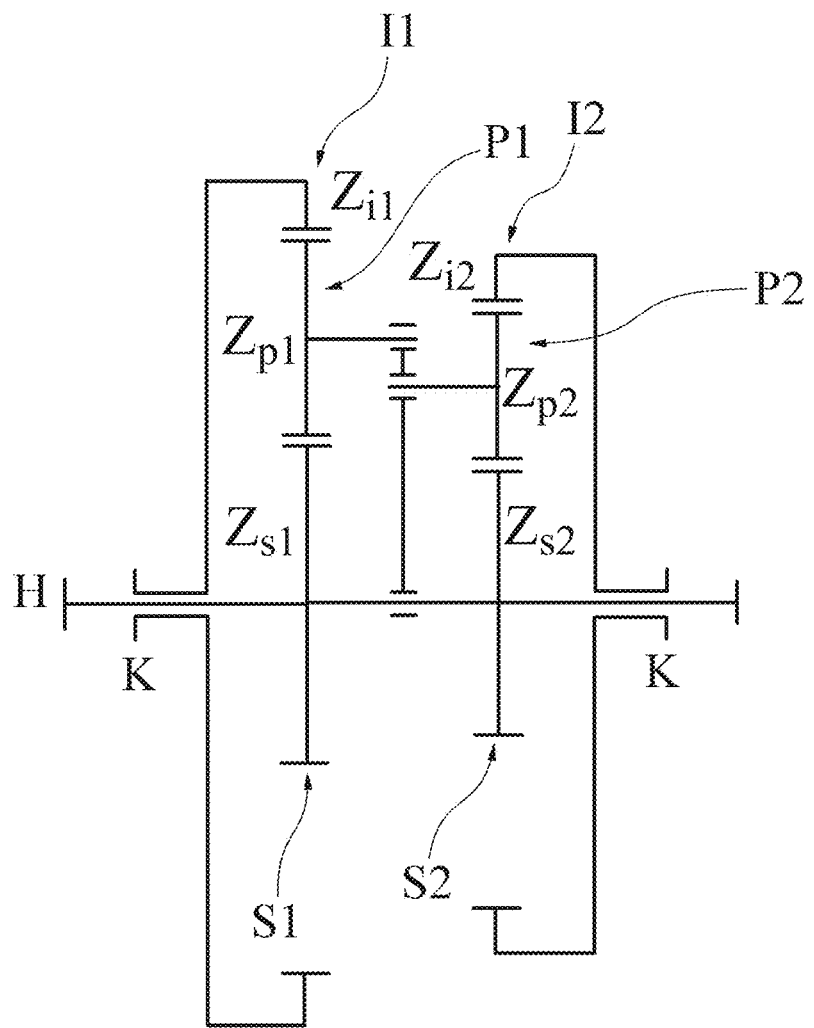
FIG. 19 is a schematic diagram showing a conventional configuration pertaining to a compound planetary gear mechanism configured by combining a plurality of sets of planetary gear mechanisms including a sun gear, a planetary gear, an internal gear, and a carrier.
Figure 20:
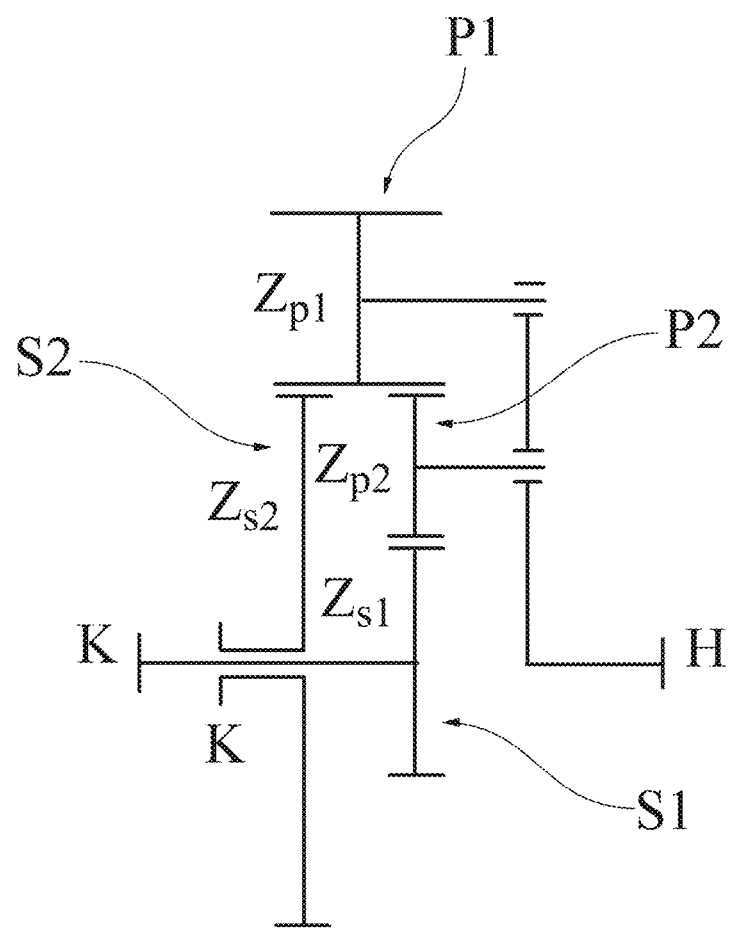
FIG. 20 is a schematic diagram showing a conventional configuration pertaining to a compound planetary gear mechanism configured by combining a plurality of sets of planetary gear mechanisms including a sun gear, a planetary gear, and a carrier without having an internal gear.

FIG. 16 is a flowchart showing an example of a design procedure for the compound planetary gear mechanism G having a configuration in which the sun gear S1 is not included. Meanwhile, the same processes as those in FIG. 15 use the same signs and description thereof is omitted.

(Step S1) A user inputs or selects set values of the compound planetary gear mechanism G The acquisition unit 101 acquires the set values and outputs the acquired set values to the arithmetic operation unit 102.

(Step S102) The arithmetic operation unit 102 generates a set of numbers of teeth $(z_{p1}, z_{p2}, z_{i1}, z_{i2})$ which can be combined.

(Step S103) The arithmetic operation unit 102 sets a set of initial numbers of teeth $(z_{p1}, z_{p2}, z_{i1}, z_{i2})$ which can be combined.

(Step S104) The arithmetic operation unit 102 assigns suitable initial values to a vector $x=(x_{p1}, x_{p2}, x_{i1}, x_{i2})$. Further, the suitable initial values are stored in the storage unit 103. Meanwhile, the vector X may use $(x_{p1}, x_{p2}, X_c)$ represented by the inter-central axis distance coefficient $X_c$.

(Step S105) The arithmetic operation unit 102 obtains a gradient vector $v=(\partial\eta/\eta x_{p1}, \partial\eta/\eta x_{p2}, \partial\eta/\eta x_{i1}, \partial\eta/\eta x_{i2})$. Alternatively, the arithmetic operation unit 102 obtains a gradient vector $v=(\partial\eta/\eta x_{p1}, \partial\eta/\eta x_{p2}, \partial\eta/\eta X_c)$. The arithmetic operation unit 102 proceeds the process to step S6.

(Step S6 to Step S9) The arithmetic operation unit 102 performs the processes of step S6 to step S9. The arithmetic operation unit 102 proceeds the process to step S10.

(Step S10) The arithmetic operation unit 102 determines whether the next combination of the numbers of teeth $(z_{p1}, z_{p2}, z_{i1}, z_{i2})$ which can be combined is present. When the arithmetic operation unit 102 determines that the next combination of the numbers of teeth $(z_{p1}, z_{p2}, z_{i1}, z_{i2})$ which can be combined is present (step 910; YES), the arithmetic operation unit 102 proceeds to the process of step S111. When the arithmetic operation unit 102 determines that the next combination of the numbers of teeth $(z_{p1}, z_{p2}, z_{i1}, z_{i2})$ which can be combined is not present (step S10; NO), the arithmetic operation unit 102 proceeds to the process of step S112.

(Step S111) The arithmetic operation unit 102 sets the numbers of teeth $(z_{p1}, z_{p2}, z_{i1}, z_{i2})$ of the next set which can be combined. After the process, the arithmetic operation unit 102 returns the process to step S104.

(Step S112) The arithmetic operation unit 102 selects a combination of the numbers of teeth $(z_{p1}, z_{p2}, z_{i1}, z_{i2})$ and addendum modification coefficients $(x_{p1}, x_{p2}, x_{i1}, x_{i2})$ which maximizes or submaximizes the power transmission efficiency η from combinations of the numbers of teeth $(z_{p1}, z_{p2}, z_{i1}, z_{i2})$ and the vector $x=(x_{p1}, x_{p2}, x_{i1}, x_{i2})$. Meanwhile, submaximum is a maximal value or an allowable range including a maximum value or a maximal value (e.g., 90% or more).

(Step S113) The arithmetic operation unit 102 outputs the combination of the numbers of teeth $(z_{p1}, z_{p2}, z_{i1}, z_{i2})$ and addendum modification coefficients $(x_{s1}, x_{p1}, x_{p2}, x_{i1}, x_{i2})$ which maximizes the power transmission efficiency η as a most suitable design value.

Although suitable embodiments of the present invention have been described in detail, the present invention is not limited to the above-described embodiments and can be modified or changed in various manners within the scope of the present invention described in the claims, and such modified or changed examples are also included in the scope of the present invention.

For example, although the planetary gears P1 and P2 have a configuration in which two or three planetary gears are arranged in the circumferential direction for each planetary gear mechanism in the above-described compound planetary gear mechanism, each planetary gear mechanism may be configured using a single planetary gear, or each planetary gear mechanism may be configured using four or more planetary gears arranged in the circumferential direction.

In addition, an arbitrary mechanism or structure such as a taper fitted structure may be used as planetary gear phase different adjustment means.

INDUSTRIAL APPLICABILITY

The present invention is applied to a planetary gear device constituting driving systems or power transmission systems of various machines and apparatuses such as industrial machines, vehicles, robots, and office automation equipment. The planetary gear device of the present invention can be desirably used as a small and light speed reducer used for robots in multi-joint structures, for example.

The planetary gear device of the present invention can alleviate the centrifugal force acting on planetary gears without including a sun gear and can be manufactured at a relatively low cost because it has the minimum number of stages of gear trains. Accordingly, the configuration of the present invention is very useful in a practical sense.

REFERENCE SIGNS LIST

P1, P2 Planetary gear
I1, I2 Internal gear
H Carrier
J Spindle
L Rotation central axis line
G Compound planetary gear mechanism
S1 Sun gear
$z_{s1}$, $z_{p1}$, $z_{p2}$, $z_{i1}$, $z_{i2}$ Number of teeth
$x_{s1}$, $x_{p1}$, $x_{p2}$, $x_{i1}$, $x_{i2}$ Addendum modification coefficient
$X_c$ Inter-central axis distance coefficient
$\eta$ Power transmission efficiency
100 Design apparatus
101 Acquisition unit
102 Arithmetic operation unit
103 Storage unit
104 Output unit

The invention claimed is:

1. A planetary gear device configured by combining first and second planetary gear mechanisms sharing a carrier,
wherein each of the first and second planetary gear mechanisms is composed of an internal gear $I_k$ and a plurality of planetary gears $P_k$ which is engaged with the internal gear $I_k$ and revolves in a circumferential direction of the internal gear $I_k$, where k indicates an index of the either the first planetary gear mechanism or second planetary gear mechanism,
wherein k=1 indicates the first planetary gear mechanism, and wherein k=2 indicates the second planetary gear mechanism,
the plurality of planetary gears $P_k$ of each of the first and second planetary gear mechanisms are composed of a spur gear in the form of an external gear,
the plurality of planetary gears $P_k$ of each of the first and second planetary gear mechanisms share a spindle thereof or have spindles thereof integrally connected to synchronously rotate on a rotation central axis of the internal gear $I_k$, or are integrated with each other to synchronously rotate on the rotation central axis of the internal gear $I_k$ in order to configure the entire planetary gear device as a two-stage gear mechanism,
the planetary gear device is configured such that the number of teeth $z_{p1}$ of a first planetary gear $P_1$ constituting the first planetary gear mechanism and the number of teeth $z_{p2}$ of a second planetary gear $P_2$ constituting the second planetary gear mechanism are different from each other,
the number of teeth on the internal gear $I_1$ of the first planetary gear mechanism is $z_{i1}$,
the number of teeth on the internal gear $I_2$ of the second planetary gear mechanism is $z_{i2}$,
an addendum modification coefficient of the first planetary gear $P_1$ is $x_{p1}$,
an addendum modification coefficient of the internal gear $I_1$ which is engaged with the first planetary gear and constitutes the first planetary gear mechanism is $x_{i1}$,
an addendum modification coefficient of the second planetary gear $P_2$ is $x_{p2}$, and
an addendum modification coefficient of the internal gear $I_2$ which is engaged with the second planetary gear and constitutes the second planetary gear mechanism is $x_{i2}$, and
wherein, when a power transmission efficiency $\eta$ of the planetary gear device is represented by a combination of the addendum modification coefficients $x_{p1}$, $x_{i1}$, $x_{p2}$, and $x_{i2}$,
the planetary gear device is configured by selecting from a combination of the addendum modification coefficients $x_{p1}$, $x_{i1}$, $x_{p2}$, and $x_{i2}$ which maximize or submaximize the power transmission efficiency $\eta$ within an allowable range of design specifications given in advance are combined,
the maximizing or submaximizing the power transmission efficiency $\eta$ being optimizing a vector $x=(x_{p1}, x_{p2}, x_{i1}$ and $x_{i2})$ by:
assigning appropriate initial values to the vector $x=(x_{p1}, x_{p2}, x_{i1}$ and $x_{i2})$;
obtaining a gradient vector $v=(\partial\eta/\partial x_{p1}, \partial\eta/\partial x_{p2}, \partial\eta/\partial x_{i1}$ and $\partial\eta/\partial x_{i2})$;
selecting a vector q which satisfies $v \cdot q > 0$;
updating $x := x + \gamma q$, $\gamma q$ being an update amount of x and $\gamma$ being a positive real number and being adjusted to satisfy $v \cdot q > 0$; and
repeatedly, with respect to an updated vector x, obtaining the gradient vector v, selecting the vector q, updating the vector x until an absolute value of $\gamma q$ decreases less than a threshold amount, and
the submaximized power transmission efficiency $\eta$ being a maximal value including a maximum value or 90% or more of the maximum value of the power transmission efficiency $\eta$.

2. The planetary gear device according to claim 1, further comprising a sun gear S1 having a number of teeth $z_{s1}$,
wherein each planetary gear $P_k$ is engaged with the sun gear S1,
an addendum modification coefficient of the sun gear S1 is $x_{s1}$, and
the planetary gear device is configured by selecting from a combination of the numbers of teeth $z_{s1}$, $z_{p1}$, $z_{p2}$, $z_{i1}$ and $z_{i2}$ on the gears and the addendum modification coefficients $x_{s1}$, $x_{p1}$, $x_{p2}$, $x_{i1}$ and $x_{i2}$ which maximize or submaximize the power transmission efficiency $\eta$, when the power transmission efficiency $\eta$ is represented by a combination of the numbers of teeth $z_{s1}$, $z_{p1}$, $z_{p2}$, $z_{i1}$ and $z_{i2}$ on the gears and the addendum modification coefficients $x_{s1}$, $x_{p1}$, $x_{p2}$, $x_{i1}$ and $x_{i2}$,
the maximizing or submaximizing the power transmission efficiency $\eta$ being optimizing a vector $x=(x_{s1}, x_{p1}, x_{p2}, x_{i1}$ and $x_{i2})$ by:
assigning appropriate initial values to the vector $x=(x_{s1}, x_{p1}, x_{p2}, x_{i1}$ and $x_{i2})$;
obtaining a gradient vector $v=(\partial\eta/\partial x_{s1}, \partial\eta/\partial x_{p1}, \partial\eta/\partial x_{p2}, \partial\eta/\partial x_{i1}$ and $\partial\eta/\partial x_{i2})$;
selecting a vector q which satisfies $v \cdot q > 0$;

updating x:=x+γq, γq being an update amount of x and γ being a positive real number and being adjusted to satisfy v·q>0; and repeatedly, with respect to an updated vector x, obtaining the gradient vector v, selecting the vector q, updating the vector x until an absolute value of γq decreases less than a threshold amount, and the submaximized power transmission efficiency η being a maximal value including a maximum value or 90% or more of the maximum value of the power transmission efficiency η.

3. The planetary gear device according to claim 1, wherein the planetary gear device is configured by selecting from a combination of the numbers of teeth $z_{p1}$, $z_{p2}$, $z_{i1}$ and $z_{i2}$ on the gears, and the addendum modification coefficients $x_{p1}$, $x_{p2}$, $x_{i1}$ and $x_{i2}$ which maximize or submaximize the power transmission efficiency η, when the power transmission efficiency η is represented by the combination of the numbers of teeth $z_{p1}$, $z_{p2}$, $z_{i1}$ and $z_{i2}$ on the gears and the addendum modification coefficients $x_{p1}$, $x_{p2}$, $x_{i1}$ and $x_{i2}$, or selecting from a combination of the numbers of teeth $z_{p1}$, $z_{p2}$, $z_{i1}$ and $z_{i2}$ on the gears, the addendum modification coefficients $x_{p1}$, $x_{p2}$, $x_{i1}$ and $x_{i2}$ and an inter-central axis distance coefficient $X_c$ which maximize or submaximize the power transmission efficiency η, when the power transmission efficiency η is represented by the combination of the numbers of teeth $z_{p1}$, $z_{p2}$, $z_{i1}$ and $z_{i2}$ on the gears, the addendum modification coefficients $x_{p1}$, $x_{p2}$, $x_{i1}$ and $x_{i2}$, and the inter-central axis distance coefficient $X_c$, the inter-central axis distance coefficient $X_c$ being an amount by which an inter-axis distance between the first planetary gear mechanism and the second planetary gear mechanism is shifted.

4. The planetary gear device according to claim 3, wherein the power transmission efficiency η ($x_{p1}$, $x_{i1}$, $x_{p2}$, $x_{i2}$ and $X_c$) is $η_0=η_1·η_2$, and the power transmission efficiency $η_k$ of the internal gear $I_k$ composed of an internal gear having a number of teeth $z_{ik}$ is represented by the following expression (1),

[Math. 1]

$$\eta_k = 1 - \mu_k \pi \left( \frac{1}{z_{ik}} - \frac{1}{z_{pk}} \right) \varepsilon_{0k} \quad (1)$$

in expression (1), subscript k represents a gear pair of each planetary gear mechanism, $\mu_k$ is a coefficient of friction between the internal gear $I_k$ and the planetary gear $P_k$, $\varepsilon_{0k}$ denotes a contact ratio of the two internal gears $I_k$ and the planetary gear $P_k$, and $\varepsilon_{0k}$ is represented by the following expression (2) in expression (1),

[Math. 2]

$$\varepsilon_{0k}=\varepsilon_{1k}^2+\varepsilon_{2k}^2+1-\varepsilon_{1k}-\varepsilon_{2k} \quad (2)$$

in expression (2), $\varepsilon_{1k}$ is an approach contact ratio, $\varepsilon_{2k}$ is a recess contact ratio, and $\varepsilon_{1k}$ and $\varepsilon_{2k}$ in expression (2) are represented by the following expression (3),

[Math. 3]

$$\varepsilon_{1k} = \frac{z_{ik}}{2\pi}(\tan a_{wk} - \tan a_{z_{ik}})$$

$$\varepsilon_{2k} = \frac{z_{pk}}{2\pi}(\tan a_{pk} - \tan a_{z_{wk}}) \quad (3)$$

in expression (3), $a_{wk}$ is a contact pressure angle, and $a_{zpk}$ and $a_{zik}$ denote addendum pressure angles, and $a_{wk}$, $a_{zpk}$ and $a_{zik}$ are represented by the following expression (4),

[Math. 4]

$$a_{wk} = \cos^{-1}\left(\frac{z_{ik} - z_{pk}}{2r_c} m_k \cos a\right) \quad (4)$$

$$a_{z_{pk}} = \cos^{-1}\left(\frac{d_{bpk}}{d_{apk}}\right)$$

$$a_{z_{ik}} = \cos^{-1}\left(\frac{d_{bik}}{d_{aik}}\right)$$

in expression (4), $r_c$ is a distance between the central axes of the internal gear $I_k$ and the planetary gear $P_k$, $m_k$ is a module, a is a standard pressure angle before being shifted, $d_{aik}$ and $d_{apk}$ are addendum circle diameters of the internal gear $I_k$ and the planetary gear $P_k$, $d_{bik}$ and $d_{bpk}$ are standard circle diameters of the internal gear $I_k$ and the planetary gear $P_k$, and $d_{aik}$, $d_{apk}$, $d_{bik}$ and $d_{bpk}$ are represented by the following expression (5),

[Math. 5]

$$d_{apk} = m_k z_{pk} + 2m_k(x_{pk} + x_{ck}) \quad (5)$$

$$d_{ai1} = m_1 z_{i1} - 2m_1(1 - (x_{i1} + x_{c1}))$$

$$d_{ai2} = m_2 z_{i2} - 2m_2(1 - (x_{in} + x_{i2} + x_{c2}))$$

$$d_{bpk} = m_k z_{pk} \cos \alpha$$

$$x_{ck} = \frac{(z_{ik} - z_{pk})(inv(a_{wk}(r_{ck} + X_c)) - inv(a_{wk}(r_{ck})))}{2 \tan a}$$

$$inv(a) = \tan a - a$$

in expression (5), the coefficient $x_{in}$ is an addendum modification coefficient for matching inter-axis distances between the gear pair P1 and I1 and the gear pair P2 and I2, coefficients $x_{c1}$ and $x_{c2}$ are addendum modification coefficients representing the influence of each gear pair which is caused by changing the inter-axis distance between the gear pair P1 and I1 and the gear pair $P_2$ and I2 by an addendum modification amount $X_c$, and the addendum modification coefficients $x_{p1}$, $x_{p2}$, $x_{i1}$, and $x_{i2}$ have relationships represented by the following expression (6) therebetween,

[Math. 6]

$$x_{i1}-x_{p1}=x_{c1}$$

$$x_{i2}-x_{p2}=x_{in}+x_{c2} \quad (6)$$

wherein inv(a) is an involute function in expression (5).

5. The planetary gear device according to claim 1 wherein the planetary gear mechanisms have a configuration which does not have a sun gear.

6. The planetary gear device according to claim 1, wherein the planetary gear mechanisms have a configuration which has a sun gear.

7. A computer-readable non-transitory storage medium storing a planetary gear device design program causing a computer for designing a planetary gear device to execute steps, the planetary gear device including a first planetary gear mechanism and a second planetary gear mechanism which share a carrier and each of which is composed of an internal gear $I_k$, wherein k is 1 and 2, a plurality of planetary gears $P_k$ which is engaged with the internal gear $I_k$ and revolves in a circumferential direction of the internal gear $I_k$, and a sun gear S1 having a number of teeth $z_{s1}$, each of the plurality of planetary gears $P_k$ is engaged with the sun gear S1, in which $I_1$ indicating an internal gear of the first planetary gear mechanism, $P_1$ indicating a plurality of planetary gears of the first planetary gear mechanism, the plurality of planetary gears $P_k$ of each of the first and second planetary gear mechanisms are composed of a spur gear in the form of an external gear, the plurality of planetary gears $P_k$ of each of the first and second planetary gear mechanisms share a spindle thereof or have spindles thereof integrally connected to synchronously rotate on a rotation central axis of the internal gear $I_k$, or are integrated with each other to synchronously rotate on the rotation central axis of the internal gear $I_k$ in order to configure the entire planetary gear device as a two-stage gear mechanism, the planetary gear device is configured such that the number of teeth $z_{p1}$ on a first planetary gear constituting the first planetary gear mechanism $P_1$ and the number of teeth $z_{p2}$ on a second planetary gear constituting the second planetary gear mechanism $P_2$ are different from each other, the number of teeth on the internal gear $I_1$ is $z_{i1}$, the number of teeth on the internal gear $I_2$ is $z_{i2}$, an addendum modification coefficient of the first planetary gear $P_1$ is $x_{p1}$, an addendum modification coefficient of the internal gear $I_1$ which is engaged with the first planetary gear and constitutes the first planetary gear mechanism is $x_{i1}$, an addendum modification coefficient of the second planetary gear $P_2$ is $x_{p2}$, an addendum modification coefficient of the internal gear $I_2$ which is engaged with the second planetary gear and constitutes the second planetary gear mechanism is $x_{i2}$, and an addendum modification coefficient of the sun gear S1 is $x_{s1}$, wherein, when a power transmission efficiency $\eta$ of the planetary gear device is represented by a combination of the numbers of teeth $z_{s1}$, $z_{p1}$, $z_{p2}$, $z_{i1}$ and $z_{i2}$ on the gears and the addendum modification coefficients $x_{s1}$, $x_{p1}$, $x_{p2}$, $x_{i1}$ and $x_{i2}$, the steps comprising:

a step of generating numbers of teeth $z_{s1}$, $z_{p1}$, $z_{p2}$, $z_{i1}$ and $z_{i2}$ which can be generated;

a step of setting an initial set among the generated numbers of teeth $z_{s1}$, $z_{p1}$, $z_{p2}$, $z_{i1}$ and $z_{i2}$ which can be generated;

a step of assigning appropriate initial values to a vector $x=(x_{s1}, x_{p1}, x_{p2}, x_{i1}$ and $x_{i2})$;

a step of obtaining a gradient vector $v=(\partial\eta/\partial x_{s1}, \partial\eta/\partial x_{p1}, \partial\eta/\partial x_{p2}, \partial\eta/\partial x_{i1}$ and $\partial\eta/\partial x_{i2})$;

a step of selecting a vector q which satisfies $v \cdot q > 0$;

a step of determining whether an absolute value of an update amount $\gamma q$ of the vector x has decreased less than a threshold amount, $\gamma q$ being an update amount of x and $\gamma$ being a positive real number and being adjusted to satisfy $v \cdot q > 0$;

a step of adding the update amount $\gamma q$ to the vector x to update the vector x when it is determined that the absolute value of the update amount $\gamma q$ has not-decreased less than a threshold amount;

a step of selecting from a combination of the numbers of teeth $z_{s1}$, $z_{p1}$, $z_{p2}$, $z_{i1}$ and $z_{i2}$ and the addendum modification coefficients $x_{s1}$, $x_{p1}$, $x_{p2}$, $x_{i1}$ and $x_{i2}$ which maximizes or submaximizes the power transmission efficiency $\eta$, the maximizing or submaximizing the power transmission efficiency $\eta$ being obtaining the vector x by repeatedly updating x when it is determined that the absolute value of the update amount $\gamma q$ has decreased less than a threshold amount, and the submaximized power transmission efficiency $\eta$ being a maximal value including a maximum value or 90% or more of the maximum value of the power transmission efficiency $\eta$; and a step of outputting the selected combination.

8. A computer-readable non-transitory storage medium storing a planetary gear device design program causing a computer for designing a planetary gear device to execute steps, the planetary gear device including a first planetary gear mechanism and a second planetary gear mechanism which share a carrier and each of which is composed of an internal gear $I_k$, wherein k is 1 and 2, and a plurality of planetary gears $P_k$ which is engaged with the internal gear $I_k$ and revolves in a circumferential direction of the internal gear $I_k$, in which $I_1$ indicating an internal gear of the first planetary gear mechanism, $P_1$ indicating a plurality of planetary gears of the first planetary gear mechanism, the plurality of planetary gears $P_k$ of each of the first and second planetary gear mechanisms are composed of a spur gear in the form of an external gear, the plurality of planetary gears $P_k$ of each of the first and second planetary gear mechanisms share a spindle thereof or have spindles thereof integrally connected to synchronously rotate on a rotation central axis of the internal gear $I_k$, or are integrated with each other to synchronously rotate on the rotation central axis of the internal gear $I_k$ in order to configure the entire planetary gear device as a two-stage gear mechanism, the planetary gear device is configured such that the number of teeth $z_{p1}$ on a first planetary gear constituting the first planetary gear mechanism $P_1$ and the number of teeth $z_{p2}$ on a second planetary gear constituting the second planetary gear mechanism $P_2$ are different from each other, the number of teeth on the internal gear $I_1$ is $z_{i1}$, the number of teeth on the internal gear $I_2$ is $z_{i2}$, an addendum modification coefficient of the first planetary gear $P_1$ is $x_{p1}$, an addendum modification coefficient of the internal gear $I_1$ which is engaged with the first planetary gear and constitutes the first planetary gear mechanism is $x_{i1}$, an addendum modification coefficient of the second planetary gear $P_2$ is $x_{p2}$, an addendum modification coefficient of the internal gear $I_2$ which is engaged with the second planetary gear and constitutes the second planetary gear mechanism is $x_{i2}$, and an inter-central axis distance coefficient which is an amount by which an inter-axis distance between the first planetary gear mechanism and the second planetary gear mechanism is shifted is $X_c$, wherein, when a power transmission efficiency $\eta$ of the planetary gear device is represented by a combination of the numbers of teeth $z_{p1}$, $z_{p2}$, $z_{i1}$ and $z_{i2}$ on the gears and the addendum modification coefficients $x_{p1}$, $x_{p2}$, $x_{i1}$ and $x_{i2}$ or a combination of the numbers of teeth $z_{p1}$, $z_{p2}$, $z_{i1}$ and $z_{i2}$ on the gears, the addendum modification coefficients $x_{p1}$, $x_{p2}$, $x_{i1}$ and $x_{i2}$, and the inter-central axis distance coefficient $X_c$, the steps comprising:

a step of generating numbers of teeth $z_{p1}$, $z_{p2}$, $z_{i1}$ and $z_{i2}$ which can be generated;

a step of setting an initial set among the generated numbers of teeth $z_{p1}$, $z_{p2}$, $z_{i1}$ and $z_{i2}$ which can be generated;

a step of assigning appropriate initial values to a vector $x=(x_{p1}, x_{p2}, x_{i1}$ and $x_{i2})$ or a vector $x=(x_{p1}, x_{p2}, x_{i1}, x_{i2}$ and $X_c)$;

a step of obtaining a gradient vector $v=(\partial\eta/\partial x_{p1}, \partial\eta/\partial x_{p2}, \partial\eta/\partial x_{i1}$ and $\partial\eta/\partial x_{i2})$ or a gradient vector $v=(\partial\eta/\partial x_{p1}, \partial\eta/\partial x_{p2}, \partial\eta/\partial x_{i1}, \partial\eta/\partial x_{i2}$ and $\partial\eta/\partial X_c)$;

a step of selecting a vector q which satisfies $v \cdot q > 0$;

a step of determining whether an absolute value of an update amount $\gamma q$ of the vector x has decreased less than a threshold amount, $\gamma q$ being an update amount of x and $\gamma$ being a positive real number and being adjusted to satisfy $v \cdot q > 0$;

a step of adding the update amount $\gamma q$ to the vector x to update the vector x when it is determined that the absolute value of the update amount $\gamma q$ has not decreased less than a threshold amount;

a step of selecting from a combination of the numbers of teeth $z_{p1}$, $z_{p2}$, $z_{i1}$ and $z_{i2}$ and the addendum modification coefficients $x_{p1}$, $x_{p2}$, $x_{i1}$ and $x_{i2}$ which maximizes or submaximizes the power transmission efficiency $\eta$ or selecting from a combination of the numbers of teeth $z_{p1}$, $z_{p2}$, $z_{i1}$ and $z_{i2}$, the addendum modification coefficients $x_{p1}$, $x_{p2}$, $x_{i1}$, $x_{i2}$ and the inter-central axis distance coefficient $X_c$ which maximizes or submaximizes the power transmission efficiency $\eta$, the maximizing or submaximizing the power transmission efficiency $\eta$ being obtaining the vector x by repeatedly updating x when it is determined that the absolute value of the update amount $\gamma q$ has decreased less than a threshold amount, and the submaximized power transmission efficiency $\eta$ being a maximal value including a maximum value or 90% or more of the maximum value of the power transmission efficiency $\eta$; and a step of outputting the selected combination.

\* \* \* \* \*